(12) United States Patent
Otsubo et al.

(10) Patent No.: US 11,459,916 B2
(45) Date of Patent: Oct. 4, 2022

(54) VALVE TIMING ADJUSTMENT DEVICE

(71) Applicant: DENSO CORPORATION, Kariya (JP)

(72) Inventors: Makoto Otsubo, Nisshin (JP); Kenichi Tomomatsu, Nisshin (JP); Shuhei Yamamoto, Nisshin (JP); Hiroki Takahashi, Kariya (JP); Soichi Kinouchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/473,503

(22) Filed: Sep. 13, 2021

(65) Prior Publication Data

US 2021/0404352 A1    Dec. 30, 2021

Related U.S. Application Data

(63) Continuation of application No. PCT/JP2020/010742, filed on Mar. 12, 2020.

(30) Foreign Application Priority Data

Mar. 15, 2019  (JP) .............................. JP2019-048883

(51) Int. Cl.
  *F01L 1/352*   (2006.01)
  *F16D 3/04*    (2006.01)
  (Continued)

(52) U.S. Cl.
  CPC ................ *F01L 1/352* (2013.01); *F16D 3/04* (2013.01); *F16H 1/32* (2013.01); *F16H 7/06* (2013.01)

(58) Field of Classification Search
  None
  See application file for complete search history.

(56) References Cited

U.S. PATENT DOCUMENTS

2014/0366824 A1*  12/2014  Sugiura ................... F01L 1/352
                                                                                 123/90.17
2015/0211392 A1    7/2015  Otsubo et al.
(Continued)

FOREIGN PATENT DOCUMENTS

JP       2017-115658      6/2017
WO    WO-2016031557 A1 *  3/2016 ............. F01L 1/047
WO    WO-2017110172 A1 *  6/2017 ............. F01L 1/352

OTHER PUBLICATIONS

U.S. Appl. No. 17/473,503, filed Sep. 13, 2021, Valve Timing Adjustment Device.
(Continued)

*Primary Examiner* — Devon C Kramer
*Assistant Examiner* — Wesley G Harris
(74) *Attorney, Agent, or Firm* — Nixon & Vanderhye P.C.

(57) ABSTRACT

A drive-side rotor is rotated synchronously with a crankshaft. A driven-side rotor is rotated integrally with a camshaft. An internal gear section is formed at the driven-side rotor. An Oldham coupling includes: a driven Oldham flange that is formed at the drive-side rotor; a drive Oldham flange that is formed at the planetary rotor; and an Oldham intermediate that is configured to synchronize rotation of the driven Oldham flange and rotation of the drive Oldham flange while permitting eccentricity between the driven Oldham flange and the drive Oldham flange. There is satisfied a relationship of θ2<θ1 where: θ1 is a maximum tilt amount of the planetary rotor relative to the driven Oldham flange; and θ2 is a maximum tilt amount of the planetary rotor in a clearance formed at the Oldham coupling.

8 Claims, 23 Drawing Sheets

(51) Int. Cl.
  *F16H 1/32* (2006.01)
  *F16H 7/06* (2006.01)

(56) References Cited

U.S. PATENT DOCUMENTS

2017/0138228 A1  5/2017  Miyachi et al.
2018/0073656 A1  3/2018  Miyachi et al.
2020/0141284 A1  5/2020  Otsubo et al.

OTHER PUBLICATIONS

U.S. Appl. No. 17/447,482, filed Sep. 13, 2021, Valve Timing Adjustment Device.
U.S. Appl. No. 17/447,482, to Otsubo, et al., entitled "Valve Timing Adjustment Device", filed Sep. 13, 2021 (39 pages).

* cited by examiner

VALVE TIMING ADJUSTMENT DEVICE

CROSS REFERENCE TO RELATED APPLICATIONS

This application is a continuation application of International Patent Application No. PCT/JP2020/010742 filed on Mar. 12, 2020, which designated the U.S. and claims the benefit of priority from Japanese Patent Application No. 2019-048883 filed on Mar. 15, 2019. The entire disclosures of all of the above applications are incorporated herein by reference.

TECHNICAL FIELD

The present disclosure relates to a valve timing adjustment device.

BACKGROUND

Previously, there is a valve timing adjustment device that uses an Oldham coupling as a member for generating relative rotation between a drive-side rotor, which is rotated synchronously with a crankshaft, and a driven-side rotor, which is rotated integrally with a camshaft, at an internal combustion engine.

For example, one previously proposed valve timing adjustment device includes: an internal gear section, which is formed at the driven-side rotor; a planetary rotor, which is meshed with the internal gear section; and the Oldham coupling. The Oldham coupling includes: driven Oldham flanges, which are formed at the drive-side rotor; drive Oldham flanges, which are formed at the planetary rotor; and an Oldham intermediate, which is configured to synchronize rotation of the driven Oldham flange and rotation of drive Oldham flange while permitting eccentricity between the driven Oldham flanges and the drive Oldham flanges.

SUMMARY

This section provides a general summary of the disclosure, and is not a comprehensive disclosure of its full scope or all of its features.

According to the present disclosure, there is provided a valve timing adjustment device for adjusting a valve timing of a valve that is opened and closed by a camshaft with a torque transmitted from a crankshaft at an internal combustion engine. The valve timing adjustment device includes a drive-side rotor, a driven-side rotor, an internal gear section, a planetary rotor and an Oldham coupling. The internal gear section is formed at one of the driven-side rotor and the drive-side rotor. The Oldham coupling includes: a driven Oldham flange that is formed at another one of the driven-side rotor and the drive-side rotor; a drive Oldham flange that is formed at the planetary rotor; and an Oldham intermediate that is configured to synchronize rotation of the driven Oldham flange and rotation of the drive Oldham flange while permitting eccentricity between the driven Oldham flange and the drive Oldham flange. The valve timing adjustment device is configured to satisfy a relationship of $\theta 2 < \theta 1$ where: $\theta 1$ is a maximum tilt amount of the planetary rotor relative to the driven Oldham flange; and $\theta 2$ is a maximum tilt amount of the planetary rotor in a clearance formed at the Oldham coupling.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
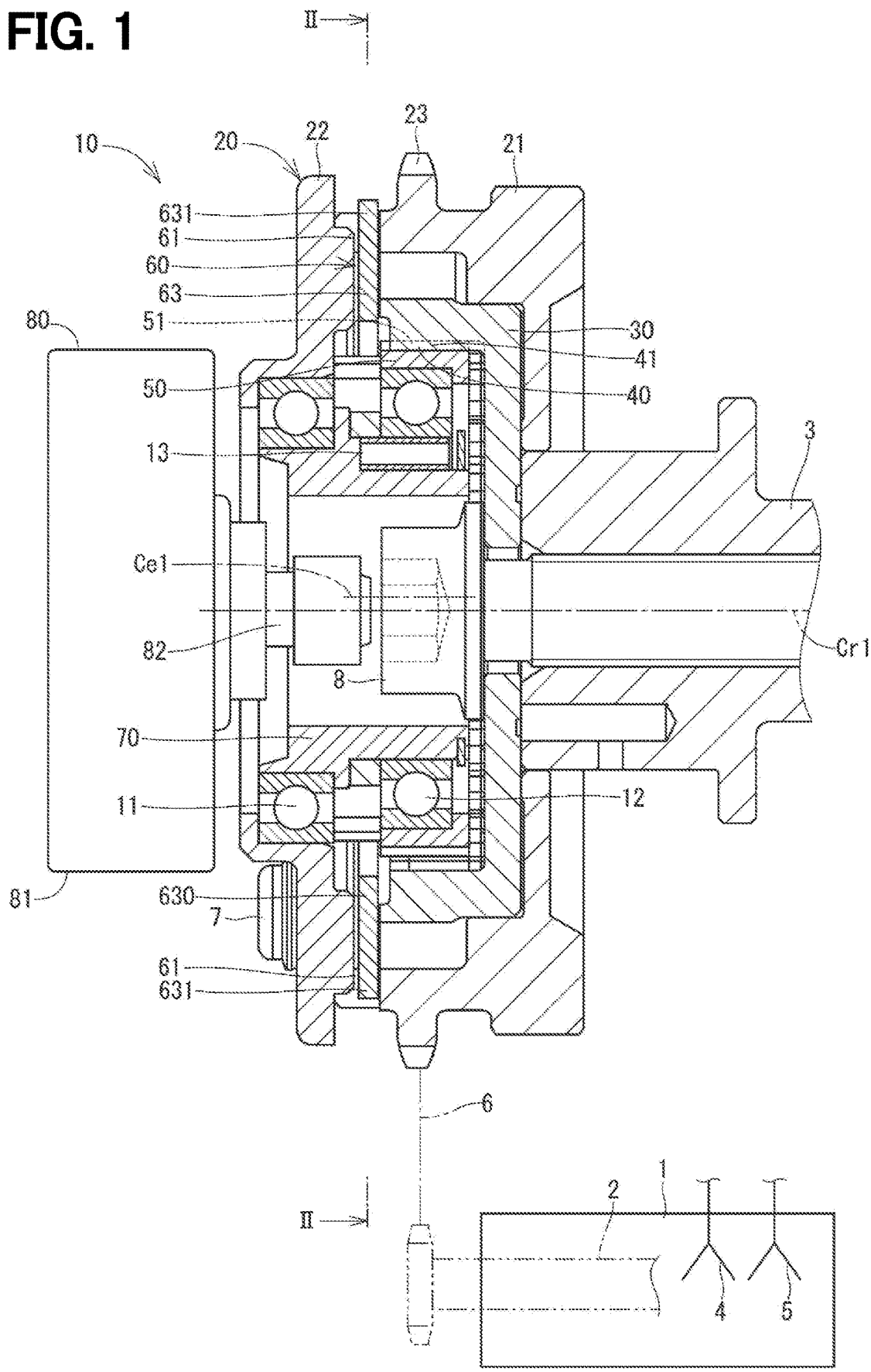
FIG. 1 is a cross-sectional view of a valve timing adjustment device of a first embodiment.

Previously, there is a valve timing adjustment device that uses an Oldham coupling as a member for generating relative rotation between a drive-side rotor, which is rotated synchronously with a crankshaft, and a driven-side rotor, which is rotated integrally with a camshaft, at an internal combustion engine.

For example, one previously proposed valve timing adjustment device includes: an internal gear section, which is formed at the driven-side rotor; a planetary rotor, which is meshed with the internal gear section; and the Oldham coupling. The Oldham coupling includes: driven Oldham flanges, which are formed at the drive-side rotor; drive Oldham flanges, which are formed at the planetary rotor; and an Oldham intermediate, which is configured to synchronize rotation of the driven Oldham flange and rotation of drive Oldham flange while permitting eccentricity between the driven Oldham flanges and the drive Oldham flanges.

The valve timing adjustment device further includes an urging member that radially outwardly urges the planetary rotor against the internal gear section. Therefore, a clearance at a meshing part, at which the internal gear section and the planetary rotor are meshed with each other, is reduced, and thereby it is possible to reduce an impact force and noise, such as backlash noise, generated when the internal gear section and the planetary rotor are rotated while meshing with each other.

However, in the valve timing adjustment device, the urging member cannot reduce a clearance between the Oldham coupling and each corresponding one of the other members and a clearance formed in the Oldham coupling. Therefore, the noise may possibly be generated from the Oldham coupling.

According to the present disclosure, there is provided a valve timing adjustment device for adjusting a valve timing of a valve that is opened and closed by a camshaft with a torque transmitted from a crankshaft at an internal combustion engine. The valve timing adjustment device includes a drive-side rotor, a driven-side rotor, an internal gear section, a planetary rotor and an Oldham coupling.

The drive-side rotor is configured to be rotated synchronously with the crankshaft about a rotation center axis that is coaxial with the camshaft. The driven-side rotor is configured to be rotated integrally with the camshaft about the rotation center axis. An internal gear section is formed at one of the driven-side rotor and the drive-side rotor. The planetary rotor has a planetary gear section which is eccentric to the rotation center axis and is meshed with the internal gear section. The Oldham coupling includes: a driven Oldham flange that is formed at another one of the driven-side rotor and the drive-side rotor; a drive Oldham flange that is formed at the planetary rotor; and an Oldham intermediate that is configured to synchronize rotation of the driven Oldham flange and rotation of the drive Oldham flange while permitting eccentricity between the driven Oldham flange and the drive Oldham flange.

The valve timing adjustment device is configured to satisfy a relationship of θ2<θ1 where: θ1 is a maximum tilt amount of the planetary rotor relative to the driven Oldham flange; and θ2 is a maximum tilt amount of the planetary rotor in a clearance formed at the Oldham coupling. Therefore, when the planetary rotor is tilted close to θ1, which is the maximum tilt amount of the planetary rotor relative to the driven Oldham flange, the clearance between the Oldham coupling and the other member(s) and the clearance in the Oldham coupling can be reduced. Therefore, it is possible to limit the generation of the noise from the Oldham coupling at the time of operating the valve timing adjustment device.

Hereinafter, a valve timing adjustment device of various embodiments will be described with reference to the draw-ings. The same reference sign is used for substantially identical constituent elements among the embodiments, and description of the same will be omitted for the sake of simplicity. In addition, substantially identical component parts in the embodiments have the same or similar effects and advantages.

First Embodiment

FIG. 1 shows a valve timing adjustment device of a first embodiment. The valve timing adjustment device 10 is installed to a torque transmission path that extends from a crankshaft 2 to a camshaft 3 at an engine 1 (serving as an internal combustion engine) of a vehicle. The camshaft 3 opens and closes intake valves 4 or exhaust valves 5 which serve as valves of the engine 1. The valve timing adjustment device 10 adjusts a valve timing of the intake valves 4.

The valve timing adjustment device 10 is driven by an actuator 80. The actuator 80 is an electric motor, such as a brushless motor, and includes a housing 81 and a control shaft 82. The housing 81 rotatably supports the control shaft 82. An operation of the actuator 80 is controlled by an electronic control unit (not shown). The electronic control unit includes, for example, a drive driver, a microcomputer, and the like, and rotationally drives the control shaft 82 by controlling energization of the actuator 80.

Figure 2:
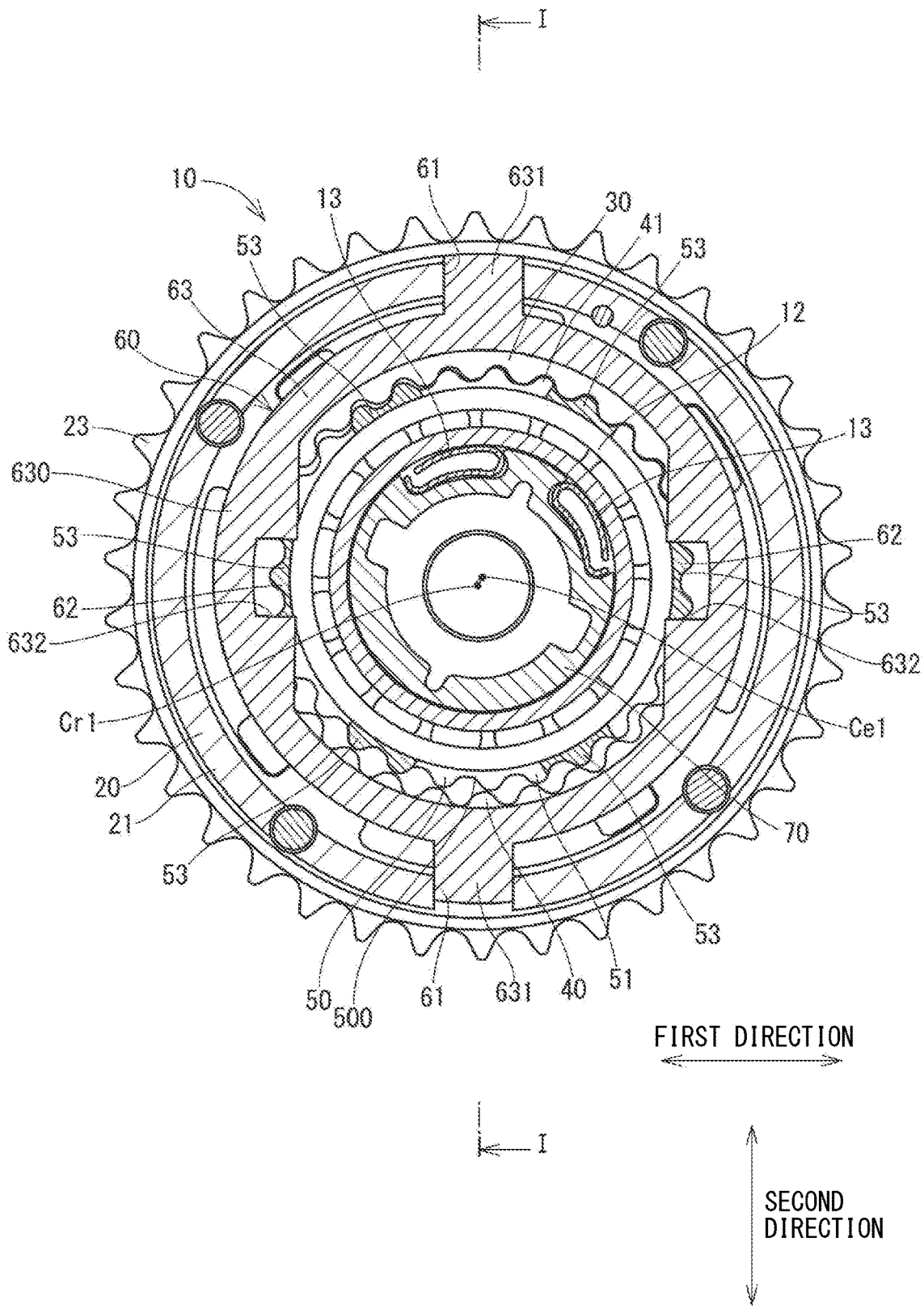
FIG. 2 is a cross-sectional view taken along line II-II in FIG. 1.

As shown in FIGS. 1 and 2, the valve timing adjustment device 10 includes a drive-side rotor 20, a driven-side rotor 30, an internal gear section 40, a planetary rotor 50, an Oldham coupling 60, an eccentric shaft 70, a bearing 11, a bearing 12, and a plurality of urging members 13.

The drive-side rotor 20 includes a rotor tubular portion 21, a rotor plate portion 22 and an engaging portion 23. The rotor tubular portion 21 is shaped in a bottomed tubular form. The rotor plate portion 22 is shaped in a ring plate form and has a surface that contacts an end part of the rotor tubular portion 21 which is opposite to a bottom part of the rotor tubular portion 21. The rotor tubular portion 21 and the rotor plate portion 22 are integrally assembled together by a plurality of bolts 7. The engaging portion 23 is, for example, a gear and is formed in a ring form at an outer peripheral wall of the rotor tubular portion 21.

A looped transmission member 6 is wound around the crankshaft 2 and the engaging portion 23. The looped transmission member 6 is, for example, a chain shaped in a loop form. The looped transmission member 6 transmits a torque of the crankshaft 2 to the engaging portion 23. Therefore, the drive-side rotor 20 is rotated about a rotation center axis Cr1, which is coaxial with the camshaft 3, synchronously with the crankshaft 2.

The driven-side rotor 30 is shaped in a bottomed tubular form. The driven-side rotor 30 is fixed to the camshaft 3 by a bolt 8 such that the driven-side rotor 30 is coaxial with the camshaft 3. Therefore, the driven-side rotor 30 is rotated synchronously with the camshaft 3 about the rotation center axis Cr1.

The internal gear section 40 is formed at the driven-side rotor 30 (serving as one of the driven-side rotor 30 and the drive-side rotor 20). The internal gear section 40 is formed at an inner peripheral wall of the driven-side rotor 30.

The planetary rotor 50 includes a rotator main body 500, a planetary gear section 51, a plurality of cutouts 52 and a plurality of projections 53.

Figure 3:
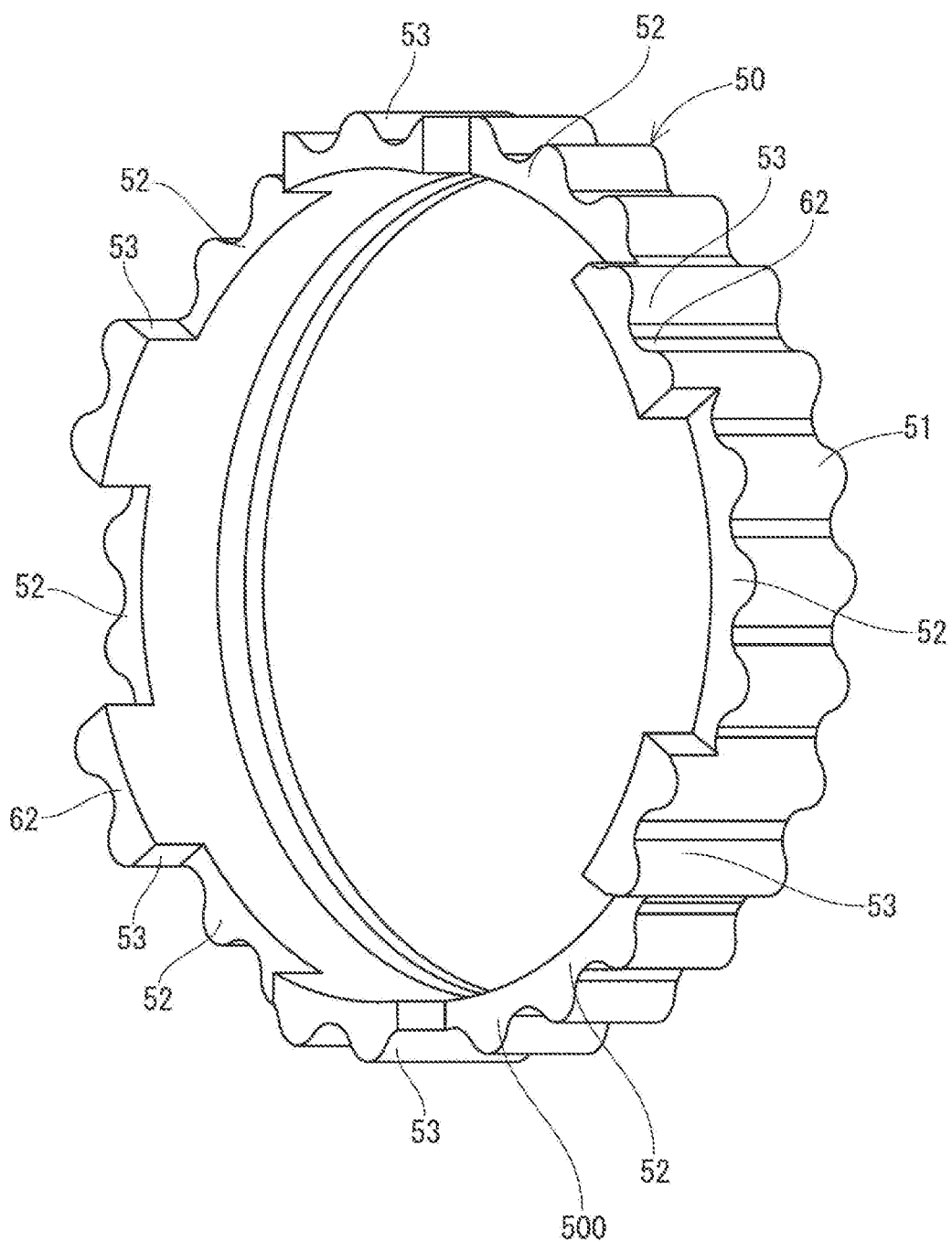
FIG. 3 is a perspective view of a planetary rotor of the valve timing adjustment device of the first embodiment.

As shown in FIG. 3, the rotator main body 500 is shaped generally in a cylindrical tubular form. The planetary gear section 51 is formed in a ring form at an outer peripheral wall of the rotator main body 500. Each of the cutouts 52 is formed in such a way that it is cut out from one end part toward the other end part of the rotator main body 500. The number of the cutouts 52 is six, and the cutouts 52 are arranged at equal intervals in a circumferential direction along the rotator main body 500. Thereby, the projections 53, the number of which is six, are formed such that each of the projections 53 is interposed between corresponding adjacent two of the cutouts 52.

As shown in FIGS. 1 and 2, the planetary gear section 51 is eccentric to the rotation center axis Cr1 and is meshed with the internal gear section 40. Here, a meshing part 41 is formed between the planetary gear section 51 and the internal gear section 40.

The Oldham coupling 60 includes a plurality of driven Oldham flanges 61, a plurality of drive Oldham flanges 62 and an Oldham intermediate 63.

As shown in FIGS. 1 and 2, the driven Oldham flanges 61 are formed at the drive-side rotor 20 (serving as another one of the driven-side rotor 30 and the drive-side rotor 20). Each of the driven Oldham flanges 61 is recessed from an end part of the rotor tubular portion 21, which is opposite to the bottom part of the rotor tubular portion 21, toward the bottom part. The number of the driven Oldham flanges 61 is two, and the driven Oldham flanges 61 are arranged at equal intervals in the circumferential direction along the rotor tubular portion 21. Specifically, the driven Oldham flanges 61 are opposed to each other about the rotation center axis Cr1.

As shown in FIGS. 2 and 3, the drive Oldham flanges 62 are formed at the planetary rotor 50. The drive Oldham flanges 62 are respectively formed at two of the projections 53 of the planetary rotor 50 while these two projections 53 are opposed to each other about an axis of the rotator main body 500.

The Oldham intermediate 63 includes an Oldham main body 630, a plurality of Oldham projections 631 and a plurality of Oldham recesses 632. The Oldham main body 630 is shaped in a ring plate form.

Each of the Oldham projections 631 radially outwardly projects from an outer periphery of the Oldham main body 630. The number of the Oldham projections 631 is two, and the Oldham projections 631 are arranged at equal intervals in the circumferential direction along the Oldham main body 630. Specifically, the Oldham projections 631 are opposed to each other about an axis of the Oldham main body 630.

Each of the Oldham recesses 632 is radially outwardly recessed from an inner periphery of the Oldham main body 630. The number of the Oldham recesses 632 is two, and the Oldham recesses 632 are arranged at equal intervals in the circumferential direction along the Oldham main body 630. Specifically, the Oldham recesses 632 are opposed to each other about the axis of the Oldham main body 630. Here, the two Oldham projections 631 and the two Oldham recesses 632 are arranged such that a straight line, which connects between centers of the two Oldham projections 631, is perpendicular to a straight line, which connects between centers of the two Oldham recesses 632.

As shown in FIG. 2, the Oldham intermediate 63 is arranged such that the Oldham recesses 632 are respectively engaged with the drive Oldham flanges 62, and the Oldham projections 631 are respectively engaged with the driven Oldham flanges 61.

The Oldham intermediate 63 is movable relative to the drive Oldham flanges 62 in a first direction. When the Oldham intermediate 63 is moved relative to the drive Oldham flanges 62 in the first direction, the Oldham recesses 632 and the drive Oldham flanges 62 are slid relative to each other.

Furthermore, the Oldham intermediate 63 is movable relative to the driven Oldham flanges 61 in a second direction. Here, the second direction is a direction that is perpendicular to the first direction. When the Oldham intermediate 63 is moved relative to the driven Oldham flanges 61 in the second direction, the Oldham projections 631 and the driven Oldham flanges 61 are slid relative to each other.

With the above structure, the Oldham intermediate 63 can synchronize the rotation of the driven Oldham flanges 61 and the rotation of the drive Oldham flanges 62 while permitting the eccentricity between the driven Oldham flanges 61 and the drive Oldham flanges 62.

The eccentric shaft 70 is shaped in a tubular form. The eccentric shaft 70 is placed at an inside of the rotor plate portion 22, an inside of the Oldham intermediate 63 and an inside of the driven-side rotor 30.

The bearing 11 is, for example, a ball bearing shaped in a ring form and is installed between an outer peripheral wall of an end part of the eccentric shaft 70, which is opposite to the camshaft 3, and an inner peripheral wall of the rotor plate portion 22. The bearing 12 is, for example, a ball bearing shaped in a ring form and is installed between an outer peripheral wall of a camshaft 3 side end part of the eccentric shaft 70 and the inner peripheral wall of the planetary rotor 50.

The bearing 11 rotatably supports the eccentric shaft 70. The bearing 12 rotatably supports the planetary rotor 50.

The outer peripheral wall of the camshaft 3 side end part of the eccentric shaft 70 is eccentric to the rotation center axis Cr1. Specifically, the outer peripheral wall of the camshaft 3 side end part of the eccentric shaft 70 is formed to extend along a cylindrical surface that is centered on an eccentric center axis Ce1 while the eccentric center axis Ce1 is spaced from the rotation center axis Cr1 in an eccentric direction and is parallel to the rotation center axis Cr1. The outer peripheral wall of the opposite end part of the eccentric shaft 70, which is opposite to the camshaft 3, is formed to extend along a cylindrical surface that is centered on the rotation center axis Cr1.

When the eccentric shaft 70 is rotated about the rotation center axis Cr1, the planetary rotor 50 orbits while spinning in a state where the planetary gear section 51 is meshed with the internal gear section 40. At this time, the Oldham intermediate 63 is moved relative to the drive Oldham flanges 62 in the first direction and is moved relative to the driven Oldham flanges 61 in the second direction. Therefore, the Oldham intermediate 63 can synchronize the rotation of the driven Oldham flanges 61 and the rotation of the drive Oldham flanges 62 while permitting the eccentricity between the driven Oldham flanges 61 and the drive Oldham flanges 62. Thus, a rotational phase between the drive-side rotor 20 and the driven-side rotor 30 changes.

The urging members 13 are installed to the outer peripheral wall of the camshaft 3 side end part of the eccentric shaft 70 such that the urging members 13 are placed at an eccentric side of the outer peripheral wall of the camshaft 3 side end part of the eccentric shaft 70. The urging members 13 urge the planetary rotor 50 through the bearing 12 toward the radially outer side, i.e., in the eccentric direction of the planetary rotor 50. The urging members 13 urge the planetary gear section 51 against the internal gear section 40 in the eccentric direction of the planetary rotor 50. Therefore, the clearance at the meshing part 41, at which the internal gear section 40 and the planetary rotor 50 are meshed with each other, is reduced, and thereby it is possible to reduce the impact force and noise, such as backlash noise, generated when the internal gear section 40 and the planetary rotor 50 are rotated while meshing with each other.

The actuator 80 is installed such that an end part of the control shaft 82 is engaged with a groove formed at an inner peripheral wall of the eccentric shaft 70. When the control shaft 82 of the actuator 80 is rotated in response to the control operation of the electronic control unit, the eccentric shaft 70 is rotated about the rotation center axis Cr1. When the eccentric shaft 70 is rotated toward one side in the rotation direction, the drive-side rotor 20 is rotated relative to the driven-side rotor 30 toward the one side in the rotation direction. In this way, the valve timing of the intake valves 4 is changed toward the advance side. When the eccentric shaft 70 is rotated toward the other side in the rotation direction, the drive-side rotor 20 is rotated relative to the driven-side rotor 30 in the rotation direction. In this way, the valve timing of the intake valves 4 is changed toward the retard side.

In the present embodiment, the valve timing adjustment device 10 is configured to satisfy a relationship of θ2<θ1 where: θ1 is a maximum tilt amount of the planetary rotor 50 relative to the driven Oldham flanges 61; and θ2 is a maximum tilt amount of the planetary rotor 50 in a clearance formed at the Oldham coupling 60.

Here, θ1 corresponds to a maximum rotation angle of the planetary rotor 50 relative to the driven Oldham flanges 61 in a state where the Oldham coupling 60 is not provided.

Figure 4:
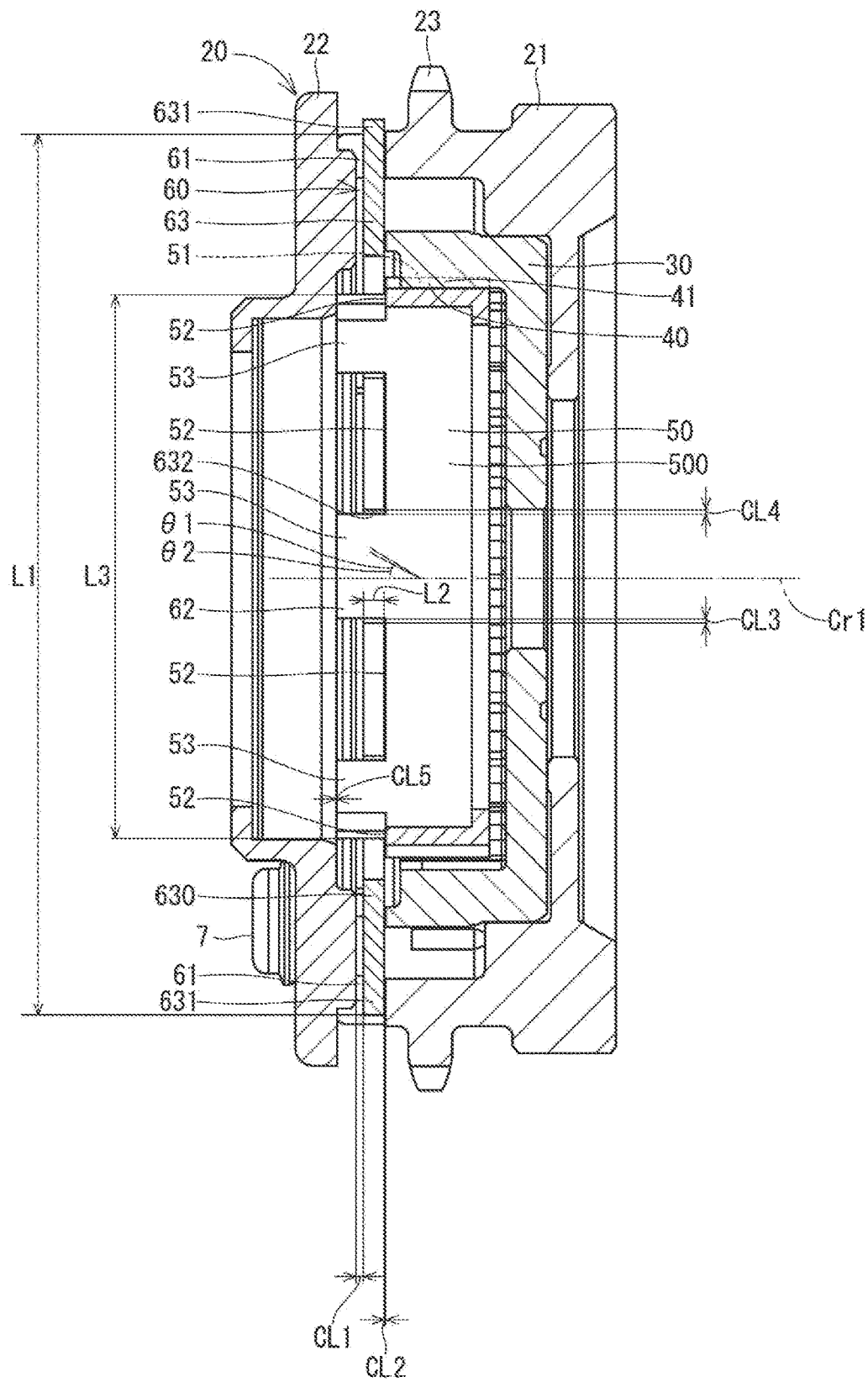
FIG. 4 is a cross-sectional view showing a portion of the valve timing adjustment device of the first embodiment.

With reference to FIG. 4, in the present embodiment, the valve timing adjustment device 10 is configured to satisfy all of relationships of: θ1=arctan (CL5/L3); and θ2=arctan ((CL1+CL2)/L1)+arctan ((CL3+CL4)/L2), where: CL1 is one of two opposite axial clearances respectively formed between the Oldham intermediate 63 and the drive-side rotor 20 in an axial direction of the rotation center axis Cr1, and CL2 is another one of the two opposite axial clearances respectively formed between the Oldham intermediate 63 and the drive-side rotor 20 in the axial direction; L1 is a diameter of an axially contacting part of the Oldham intermediate 63 that is configured to axially contact the drive-side rotor 20; CL3 is one of two opposite circumferential clearances respectively formed between the planetary rotor 50 and the Oldham intermediate 63 in a circumferential direction, and CL4 is another one of the two opposite circumferential clearances respectively formed between the planetary rotor 50 and the Oldham intermediate 63 in the circumferential direction; L2 is an axial length of a circumferentially contacting part of the Oldham intermediate 63 that is configured to circumferentially contact the planetary rotor 50; CL5 is an axial clearance between the planetary rotor 50 and the drive-side rotor 20; and L3 is a diameter of an axially contacting part of the planetary rotor 50 that is configured to axially contact the drive-side rotor 20.

Figure 5:
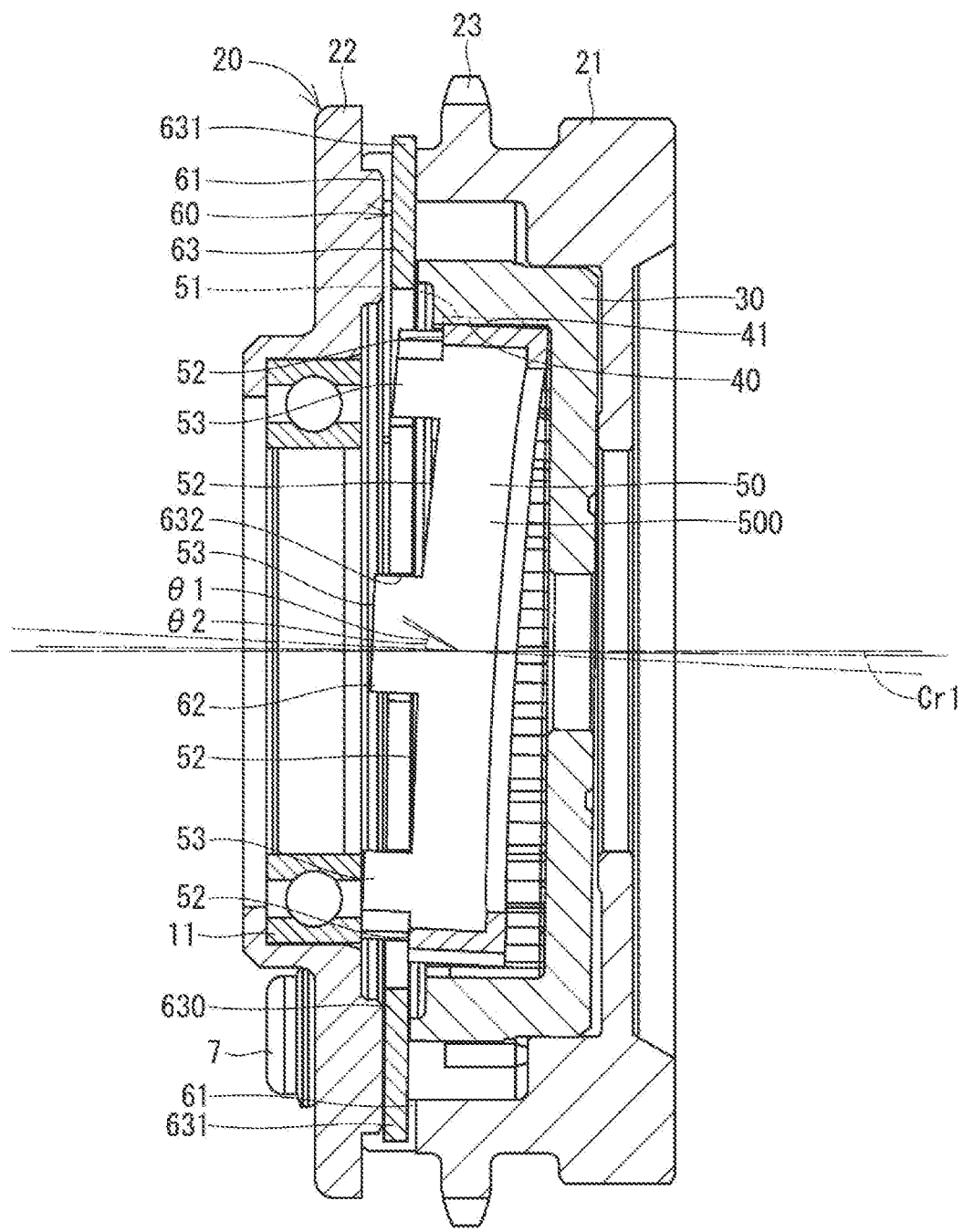
FIG. 5 is a cross-sectional view showing the portion of the valve timing adjustment device of the first embodiment.

Since the clearances are set between the Oldham coupling 60 and the other members and are also set between the corresponding adjacent members of the Oldham coupling 60, the axes of, for example, the driven-side rotor 30, the planetary rotor 50 and the Oldham intermediate 63 of the Oldham coupling 60 may possibly be tilted relative to the drive-side rotor 20 during the operation of the valve timing adjustment device 10 (see FIG. 5).

As described above, according to the present embodiment, the valve timing adjustment device 10 is configured to satisfy the relationship of θ2<θ1. Therefore, when the planetary rotor 50 is tilted close to θ1, which is the maximum tilt amount of the planetary rotor 50 relative to the driven Oldham flanges 61, the clearance between the Oldham coupling 60 and each corresponding one of the other members and the clearance in the Oldham coupling 60 can be reduced, i.e., can be reduced to zero. Therefore, it is possible to limit the generation of the noise from the Oldham coupling 60 at the time of operating the valve timing adjustment device 10.

As described above, according to the present embodiment, there is provided the valve timing adjustment device 10 for adjusting the valve timing of the intake valve 4 that is opened and closed by the camshaft 3 with the torque transmitted from the crankshaft 2 of the engine 1. The valve timing adjustment device 10 includes the drive-side rotor 20, the driven-side rotor 30, the internal gear section 40, the planetary rotor 50 and the Oldham coupling 60.

The drive-side rotor 20 is configured to be rotated synchronously with the crankshaft 2 about the rotation center axis Cr1 that is coaxial with the camshaft 3. The driven-side rotor 30 is configured to be rotated integrally with the camshaft 3 about the rotation center axis Cr1. The internal gear section 40 is formed at the driven-side rotor 30 (serving as the one of the driven-side rotor 30 and the drive-side rotor 20). The planetary rotor 50 has the planetary gear section 51 which is eccentric to the rotation center axis Cr1 and is meshed with the internal gear section 40. The Oldham coupling 60 includes: the driven Oldham flange 61 that is formed at the drive-side rotor 20 (serving as the another one of the driven-side rotor 30 and the drive-side rotor 20); the drive Oldham flange 62 that is formed at the planetary rotor 50; and the Oldham intermediate 63 that is configured to synchronize rotation of the driven Oldham flange 61 and rotation of the drive Oldham flange 62 while permitting eccentricity between the driven Oldham flange 61 and the drive Oldham flange 62.

The valve timing adjustment device is configured to satisfy the relationship of θ2<θ1 where: θ1 is the maximum tilt amount of the planetary rotor 50 relative to the driven Oldham flange 61; and θ2 is the maximum tilt amount of the planetary rotor 50 in the clearance formed at the Oldham coupling 60. Therefore, when the planetary rotor 50 is tilted close to θ1, which is the maximum tilt amount of the planetary rotor 50 relative to the driven Oldham flange 61, the clearance between the Oldham coupling 60 and the other member(s) and the clearance in the Oldham coupling 60 can be reduced. Therefore, it is possible to limit the generation of the noise from the Oldham coupling 60 at the time of operating the valve timing adjustment device 10.

Furthermore, according to the present embodiment, the valve timing adjustment device 10 is configured to satisfy all of the relationships of: θ1=arctan (CL5/L3); and θ2=arctan ((CL1+CL2)/L1)+arctan ((CL3+CL4)/L2), where: CL1 is the one of the two opposite axial clearances respectively formed between the Oldham intermediate 63 and the drive-side rotor 20 in the axial direction of the rotation center axis Cr1, and CL2 is the another one of the two opposite axial clearances respectively formed between the Oldham intermediate 63 and the drive-side rotor 20 in the axial direction; L1 is the diameter of the axially contacting part of the Oldham intermediate 63 that is configured to axially contact the drive-side rotor 20; CL3 is the one of the wo opposite circumferential clearances respectively formed between the planetary rotor 50 and the Oldham intermediate 63 in the circumferential direction, and CL4 is the another one of the two opposite circumferential clearances respectively formed between the planetary rotor 50 and the Oldham intermediate 63 in the circumferential direction; L2 is the axial length of the circumferentially contacting part of the Oldham intermediate 63 that is configured to circumferentially contact the planetary rotor 50; CL5 is the axial clearance between the planetary rotor 50 and the drive-side rotor 20; and L3 is the diameter of the axially contacting part of the planetary rotor 50 that is configured to axially contact the drive-side rotor 20. Therefore, the respective members of the Oldham coupling 60 can be smoothly moved relative to the driven Oldham flange 61 and the drive Oldham flange 62.

Second Embodiment

Figure 6:
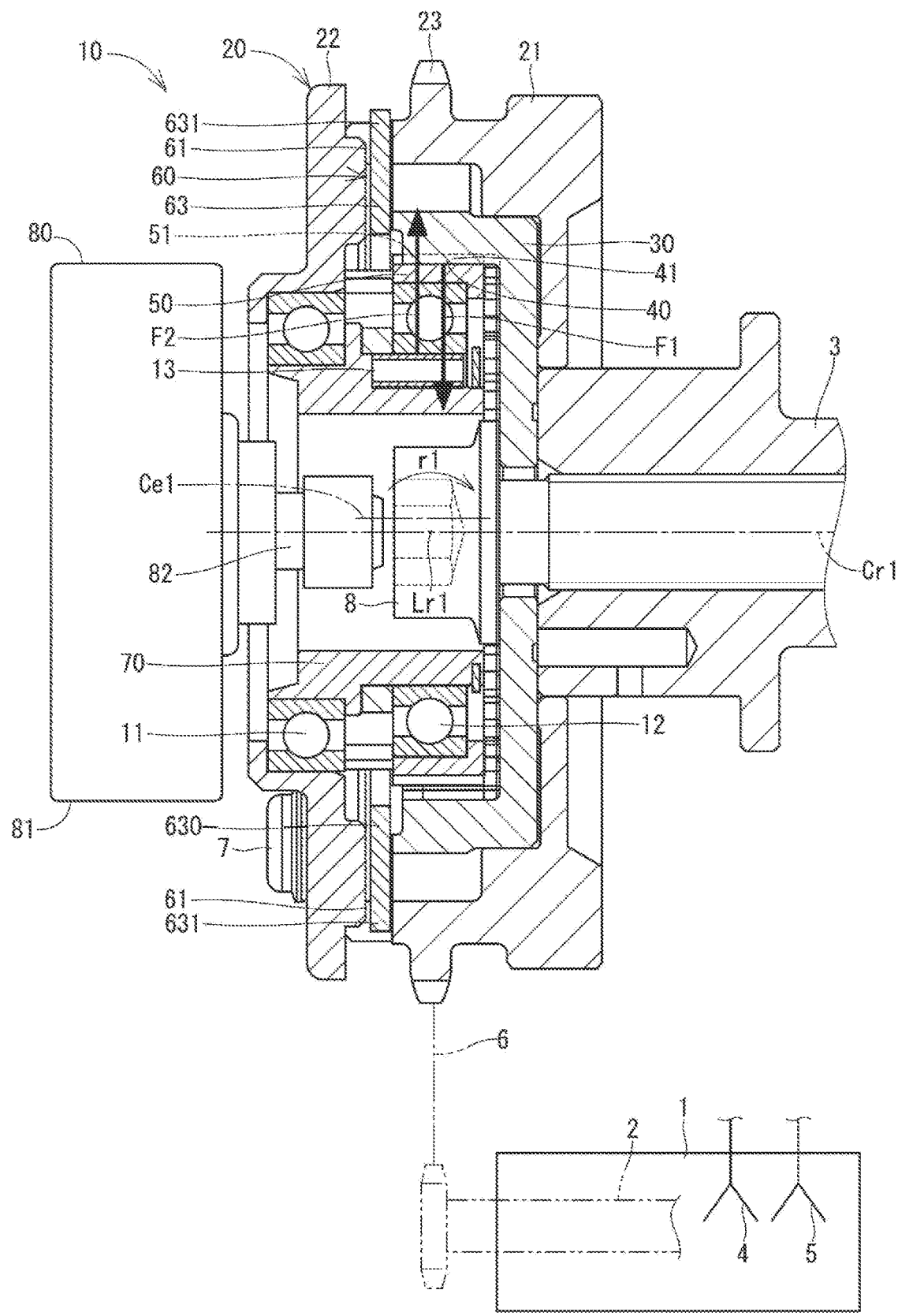
FIG. 6 is a cross-sectional view of a valve timing adjustment device of a second embodiment.

FIG. 6 shows a valve timing adjustment device of a second embodiment. The second embodiment differs from the first embodiment with respect to locations of lines of forces respectively applied to the corresponding members.

In the present embodiment, a line of a force F1, which is radially applied to the meshing part 41 between the internal gear section 40 and the planetary gear section 51, and a line of a force F2, which is radially applied to the planetary rotor 50, are spaced from each other in the axial direction of the rotation center axis Cr1.

Here, the force F1 is radially inwardly applied to an axial center of the meshing part 41, which is centered in the axial direction of the meshing part 41 (the axial direction of the rotation center axis Cr1). The force F2 is radially outwardly applied from the axial center of the urging members 13, which is centered in the axial direction of the urging members 13 (the axial direction of the rotation center axis Cr1), to the bearing 12 and the planetary rotor 50. Therefore, the planetary rotor 50 is tilted relative to the other members, such as the drive-side rotor 20, the driven-side rotor 30 and the Oldham coupling 60 so that the planetary rotor 50 is rotated in a rotation direction r1 about a straight line Lr1 (serving as a rotation axis) that is perpendicular to the rotation center axis Cr1.

In the present embodiment, like in the first embodiment, the valve timing adjustment device 10 is configured to satisfy all of the relationships: θ1=arctan (CL5/L3); θ2=arctan ((CL1+CL2)/L1)+arctan ((CL3+CL4)/L2); and θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the line of the force F1, which is radially applied to the meshing part 41 between the internal gear section 40 and the planetary gear section 51, and the line of the force F2, which is radially applied to the planetary rotor 50, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Third Embodiment

Figure 7:
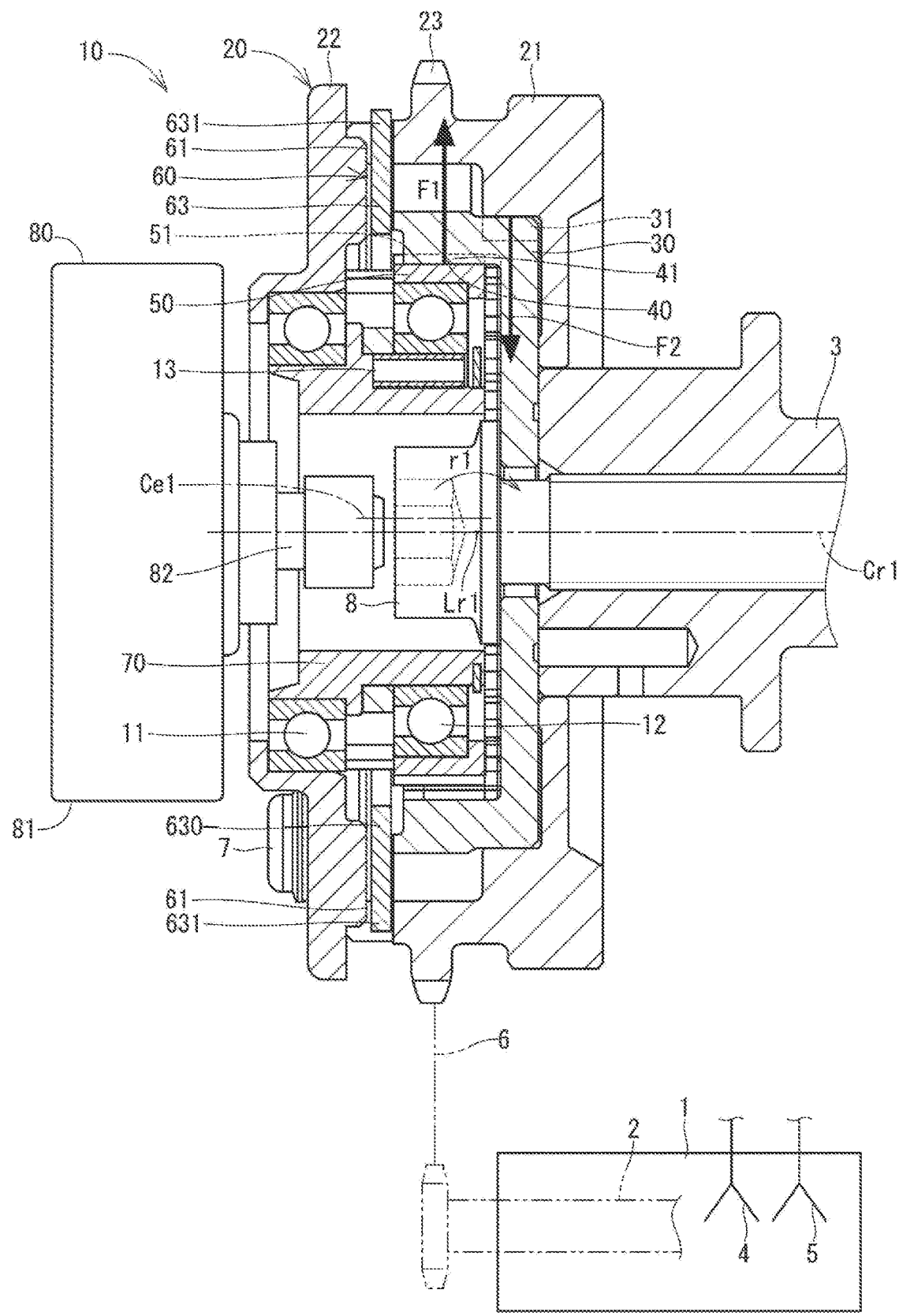
FIG. 7 is a cross-sectional view of a valve timing adjustment device of a third embodiment.

FIG. 7 shows a valve timing adjustment device of a third embodiment. The third embodiment differs from the second embodiment with respect to locations of lines of forces respectively applied to the corresponding members.

In the present embodiment, the driven-side rotor 30, at which the internal gear section 40 is formed, has a bearing portion 31 that rotatably and radially supports the drive-side rotor 20. The bearing portion 31 is formed at an outer peripheral wall of a camshaft 3 side end part of the driven-side rotor 30.

A line of a force F1, which is radially applied to the meshing part 41 between the internal gear section 40 and the planetary gear section 51, and a line of a force F2, which is radially applied to the bearing portion 31, are spaced from each other in the axial direction of the rotation center axis Cr1.

Here, the force F1 is radially outwardly applied to the axial center of the meshing part 41, which is centered in the axial direction of the meshing part 41 (the axial direction of the rotation center axis Cr1). The force F2 is radially inwardly applied from an inner peripheral wall of the rotor tubular portion 21 to an axial center of the bearing portion 31, which is centered in an axial direction of the bearing portion 31 (the axial direction of the rotation center axis Cr1). Therefore, the planetary rotor 50 is tilted relative to the other members, such as the drive-side rotor 20, the driven-side rotor 30 and the Oldham coupling 60, so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy all of the relationships: θ1=arctan (CL5/L3); θ2=arctan ((CL1+CL2)/L1)+arctan ((CL3+CL4)/L2); and θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the driven-side rotor 30 (serving as the one of the driven-side rotor 30 and the drive-side rotor 20, at which the internal gear section 40 is formed) has the bearing portion 31 that rotatably and radially supports the drive-side rotor 20 (serving as the another one of the driven-side rotor 30 and the drive-side rotor 20). The line of the force F1, which is radially applied to the meshing part 41 between the internal gear section 40 and the planetary gear section 51, and the line of the force F2, which is radially applied to the bearing portion 31, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Fourth Embodiment

Figure 8:
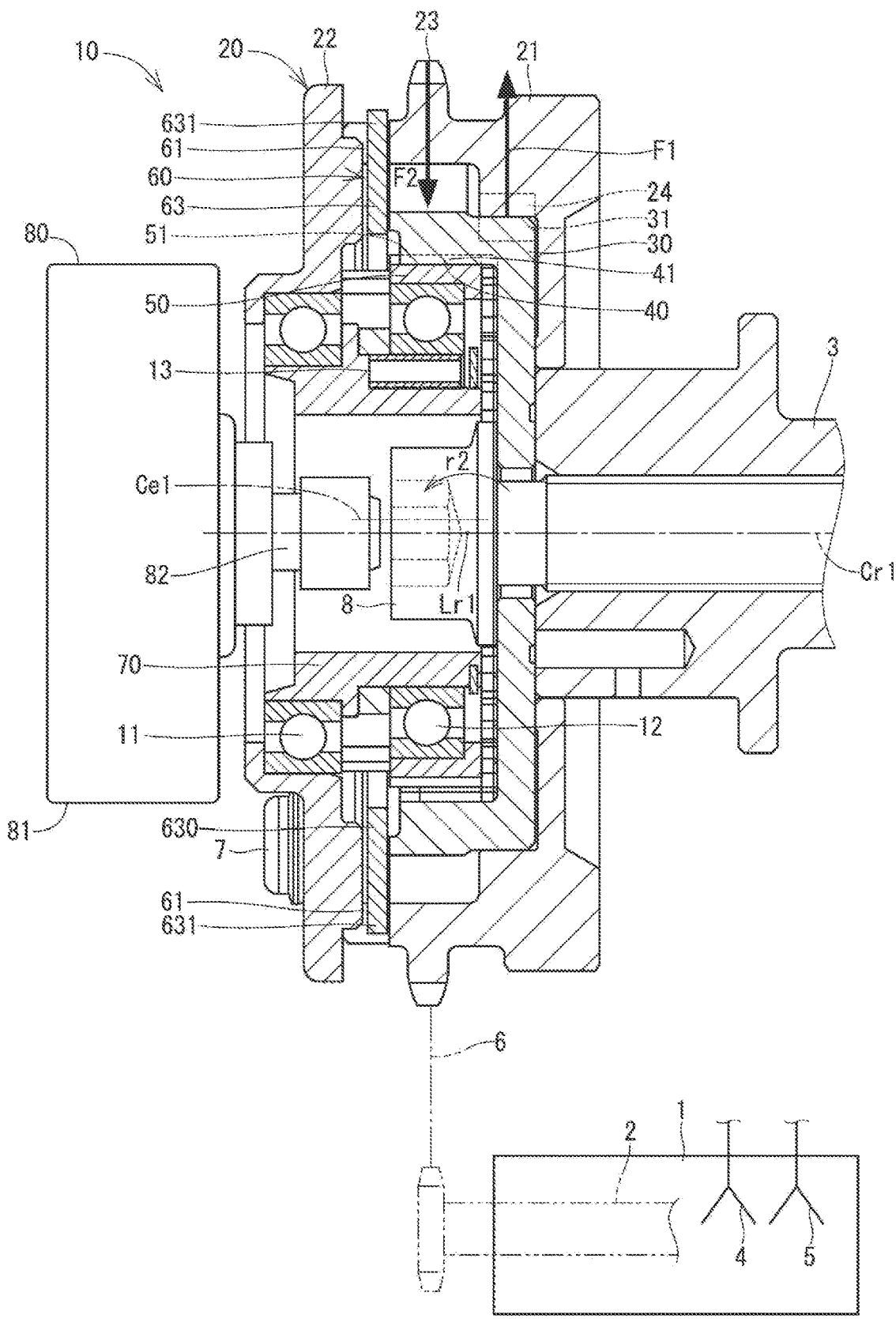
FIG. 8 is a cross-sectional view of a valve timing adjustment device of a fourth embodiment.

FIG. 8 shows a valve timing adjustment device of a fourth embodiment. The fourth embodiment differs from the second embodiment with respect to locations of lines of forces respectively applied to the corresponding members.

In the present embodiment, the drive-side rotor 20 has a bearing portion 24 that rotatably and radially supports the driven-side rotor 30. The bearing portion 24 is formed at an inner peripheral wall of the rotor tubular portion 21 such that the bearing portion 24 is opposed to the bearing portion 31 of the driven-side rotor 30.

The drive-side rotor 20 includes the engaging portion 23, to which the looped transmission member 6 configured to transmit the torque from the crankshaft 2 is engaged. The engaging portion 23 is formed at the outer peripheral wall of the rotor tubular portion 21 at a corresponding location that is on the outer side of the bearing 12 in the radial direction.

A line of a force F1, which is radially applied to the bearing portion 24, and a line of a force F2, which is radially applied from the looped transmission member 6 to the engaging portion 23, are spaced from each other in the axial direction of the rotation center axis Cr1.

Here, the force F1 is radially outwardly applied to an axial center of the bearing portion 24, which is centered in an axial direction of the bearing portion 24 (the axial direction of the rotation center axis Cr1). The force F2 is radially inwardly applied from the looped transmission member 6 to an axial center of the engaging portion 23, which is centered in the axial direction of the engaging portion 23 (the axial direction of the rotation center axis Cr1). Therefore, the planetary rotor 50 is tilted relative to the other members, such as the drive-side rotor 20, the driven-side rotor 30 and the Oldham coupling 60, so that the planetary rotor 50 is rotated in a rotation direction r2 about the straight line Lr1 (serving as the rotation axis) that is perpendicular to the rotation center axis Cr1.

In the present embodiment, like in the first embodiment, the valve timing adjustment device 10 is configured to satisfy all of the relationships: θ1=arctan (CL5/L3); θ2=arctan ((CL1+CL2)/L1)+arctan ((CL3+CL4)/L2); and θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the drive-side rotor 20 includes: the bearing portion 24 that rotatably and radially supports the driven-side rotor 30; and the engaging portion 23, to which the looped transmission member 6 configured to transmit the torque from the crankshaft 2 is engaged. The line of the force F1, which is radially applied to the bearing portion 24, and the line of the force F2, which is radially applied from the looped transmission member 6 to the engaging portion 23, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Fifth Embodiment

Figure 9:
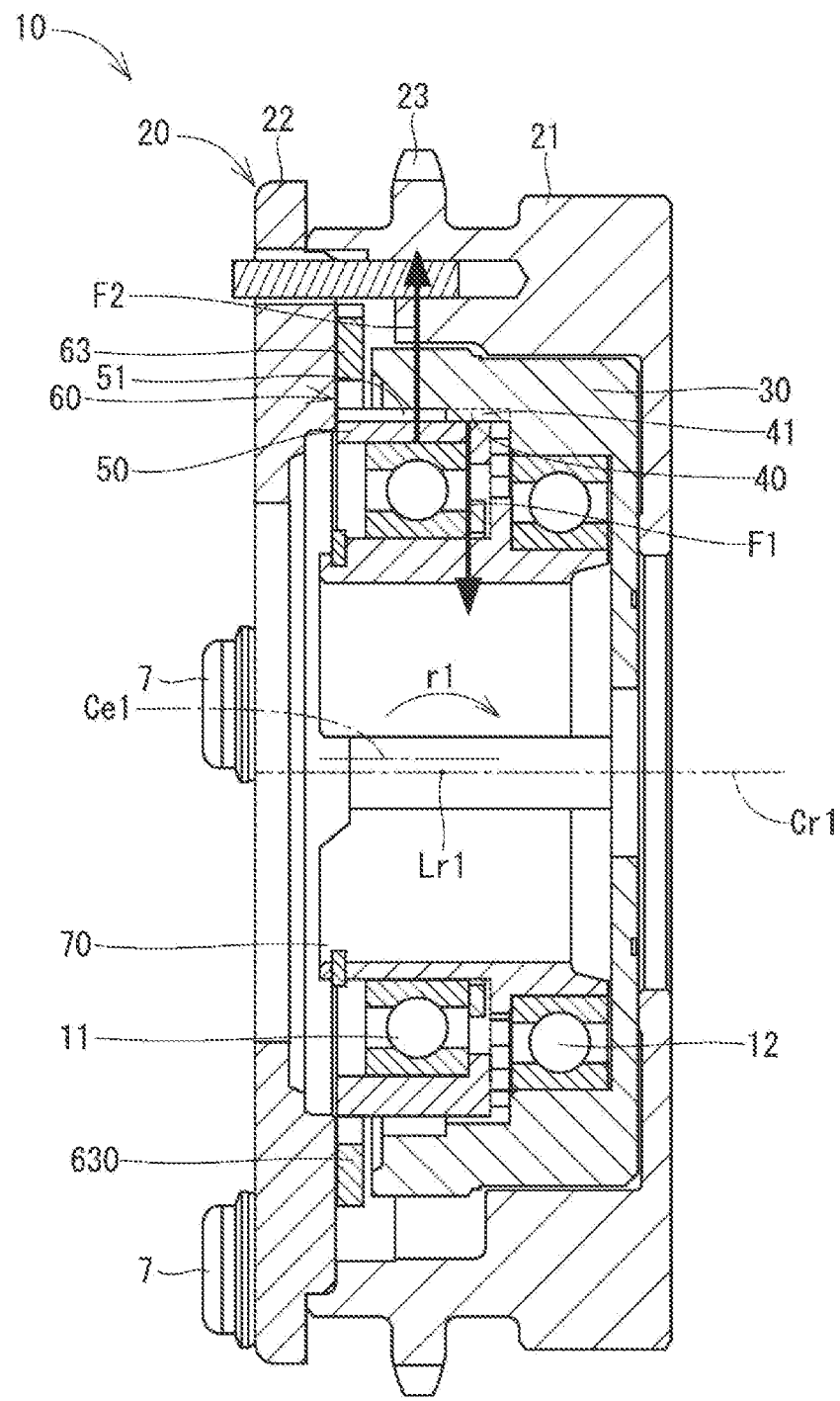
FIG. 9 is a cross-sectional view of a valve timing adjustment device of a fifth embodiment.

FIG. 9 shows a valve timing adjustment device of a fifth embodiment. The fifth embodiment differs from the first embodiment with respect to the structure of the eccentric shaft 70 and the position of the planetary rotor 50.

In the present embodiment, the outer peripheral wall of the end part of the eccentric shaft 70, which is opposite to the camshaft 3, is eccentric to the rotation center axis Cr1. Specifically, the outer peripheral wall of the end part of the eccentric shaft 70, which is opposite to the camshaft 3, is formed to extend along a cylindrical surface that is centered on the eccentric center axis Ce1 while the eccentric center axis Ce1 is spaced from the rotation center axis Cr1 in the eccentric direction and is parallel to the rotation center axis Cr1. The outer peripheral wall of the camshaft 3 side end part of the eccentric shaft 70 is formed to extend along a cylindrical surface that is centered on the rotation center axis Cr1.

The bearing 11 is installed between the outer peripheral wall of the end part of the eccentric shaft 70, which is opposite to the camshaft 3, and the inner peripheral wall of the planetary rotor 50. The bearing 12 is installed between the outer peripheral wall of the camshaft 3 side end part of the eccentric shaft 70 and the inner peripheral wall of the camshaft 3 side end part of the driven-side rotor 30.

The internal gear section 40 is formed at the inner peripheral wall of the driven-side rotor 30 such that the internal gear section 40 is meshed with the planetary gear section 51. The meshing part 41 is formed between the internal gear section 40 and the planetary gear section 51.

In the present embodiment, a line of a force F1, which is radially applied to the meshing part 41 between the internal gear section 40 and the planetary gear section 51, and a line of a force F2, which is radially applied to the planetary rotor 50, are spaced from each other in the axial direction of the rotation center axis Cr1.

Here, the force F1 is radially inwardly applied to the axial center of the meshing part 41, which is centered in the axial direction of the meshing part 41 (the axial direction of the rotation center axis Cr1). The force F2 is radially outwardly applied from an axial center of the bearing 11, which is centered in the axial direction of the bearing 11 (the axial direction of the rotation center axis Cr1) to the planetary rotor 50. Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy all of the relationships: θ1=arctan (CL5/L3); θ2=arctan ((CL1+CL2)/L1)+arctan ((CL3+CL4)/L2); and θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the line of the force F1, which is radially applied to the meshing part 41 between the internal gear section 40 and the planetary gear section 51, and the line of the force F2, which is radially applied to the planetary rotor 50, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Sixth Embodiment

Figure 10:
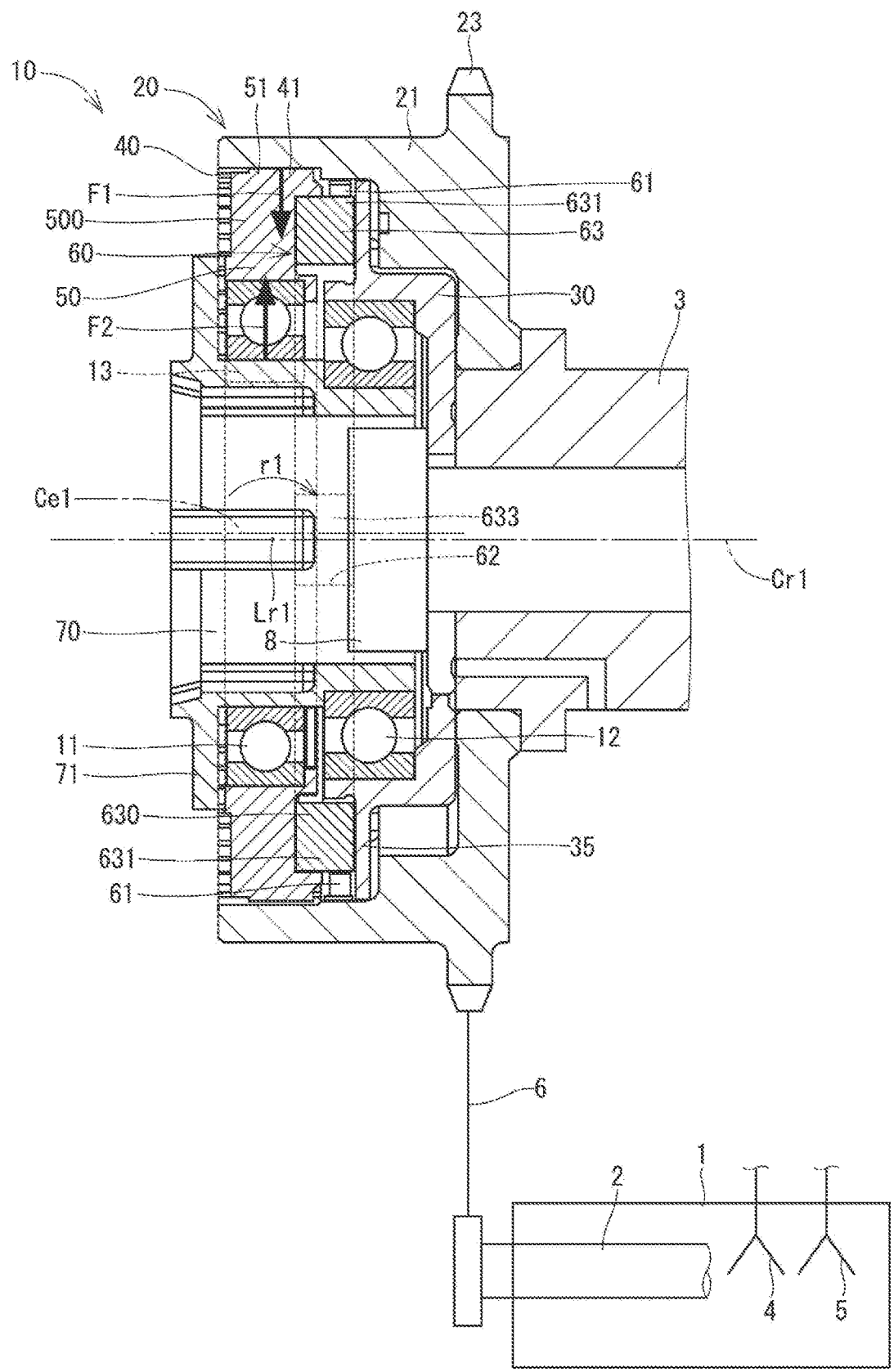
FIG. 10 is a cross-sectional view of a valve timing adjustment device of a sixth embodiment.

FIG. 10 shows a valve timing adjustment device of a sixth embodiment. The sixth embodiment differs from the first embodiment with respect to the structures of the drive-side rotor 20, the driven-side rotor 30 and the eccentric shaft 70 and the position of the planetary rotor 50.

In the present embodiment, the drive-side rotor 20 does not include the rotor plate portion 22. The internal gear section 40 is formed at the drive-side rotor 20. At the drive-side rotor 20, the internal gear section 40 is formed at an inner peripheral wall of an end part of the rotor tubular portion 21, which is opposite to the camshaft 3.

The planetary gear section 51 is formed at the planetary rotor 50 at a location that is on an inner side of the end part of the rotor tubular portion 21, which is opposite to the camshaft 3, so that the planetary gear section 51 is meshed with the internal gear section 40. The meshing part 41 is formed between the internal gear section 40 and the planetary gear section 51.

The driven Oldham flanges 61 are formed at the driven-side rotor 30. A flange 35 is formed at an end part of the driven-side rotor 30, which is opposite to the camshaft 3, such that the flange 35 is shaped in a plate form and radially outwardly extends from an outer peripheral wall of the end part of the driven-side rotor 30. At the driven-side rotor 30, each of the driven Oldham flanges 61 is recessed from an end surface of the flange 35, which is opposite to the camshaft 3, toward the camshaft 3. The number of the driven Oldham flanges 61 is two, and the driven Oldham flanges 61 are arranged at equal intervals in the circumferential direction along the driven-side rotor 30. Specifically, the driven Oldham flanges 61 are opposed to each other about the rotation center axis Cr1.

The drive Oldham flanges 62 are formed at the planetary rotor 50. At the planetary rotor 50, each of the drive Oldham flanges 62 is recessed from a camshaft 3 side end surface of the rotator main body 500 toward the opposite side that is opposite to the camshaft 3. The number of the drive Oldham flanges 62 is two, and the drive Oldham flanges 62 are arranged at equal intervals in the circumferential direction along the rotator main body 500. Specifically, the drive Oldham flanges 62 are opposed to each other about the rotation center axis Cr1.

The Oldham intermediate 63 has a plurality of Oldham projections 633 in place of the Oldham recesses 632. Each of the Oldham projections 633 radially outwardly projects from the outer periphery of the Oldham main body 630. The number of the Oldham projections 633 is two, and the Oldham projections 633 are arranged at equal intervals in the circumferential direction along the Oldham main body 630. Specifically, the Oldham projections 633 are opposed to each other about the axis of the Oldham main body 630. Here, the two Oldham projections 631 and the two Oldham projections 633 are arranged such that a straight line, which connects between centers of the two Oldham projections 631, is perpendicular to a straight line, which connects between centers of the two Oldham projections 633.

The Oldham intermediate 63 is arranged such that the Oldham projections 633 are respectively engaged with the drive Oldham flanges 62, and the Oldham projections 631 are respectively engaged with the driven Oldham flanges 61.

The Oldham intermediate 63 is movable relative to the drive Oldham flanges 62 in the first direction. When the Oldham intermediate 63 is moved relative to the drive Oldham flanges 62 in the first direction, the Oldham projections 633 and the drive Oldham flanges 62 are slid relative to each other.

Furthermore, the Oldham intermediate 63 is movable relative to the driven Oldham flanges 61 in the second direction. Here, the second direction is the direction that is perpendicular to the first direction. When the Oldham intermediate 63 is moved relative to the driven Oldham flanges 61 in the second direction, the Oldham projections 631 and the driven Oldham flanges 61 are slid relative to each other.

With the above structure, the Oldham intermediate 63 can synchronize the rotation of the driven Oldham flanges 61 and the rotation of the drive Oldham flanges 62 while permitting the eccentricity between the driven Oldham flanges 61 and the drive Oldham flanges 62.

In the present embodiment, the outer peripheral wall of the end part of the eccentric shaft 70, which is opposite to the camshaft 3, is eccentric to the rotation center axis Cr1. Specifically, the outer peripheral wall of the end part of the eccentric shaft 70, which is opposite to the camshaft 3, is formed to extend along a cylindrical surface that is centered on the eccentric center axis Ce1 while the eccentric center axis Ce1 is spaced from the rotation center axis Cr1 in the eccentric direction and is parallel to the rotation center axis Cr1. The outer peripheral wall of the camshaft 3 side end part of the eccentric shaft 70 is formed to extend along a cylindrical surface that is centered on the rotation center axis Cr1.

The bearing 11 is installed between the outer peripheral wall of the end part of the eccentric shaft 70, which is opposite to the camshaft 3, and the inner peripheral wall of the planetary rotor 50. The bearing 12 is installed between the outer peripheral wall of the camshaft 3 side end part of the eccentric shaft 70 and the inner peripheral wall of the camshaft 3 side end part of the driven-side rotor 30.

The urging members 13 are installed to the outer peripheral wall of the end part of the eccentric shaft 70, which is opposite to the camshaft 3, such that the urging members 13 are placed at the eccentric side of the outer peripheral wall of the end part of the eccentric shaft 70. The urging members 13 urge the planetary rotor 50 through the bearing 11 toward the radially outer side, i.e., in the eccentric direction of the planetary rotor 50. The urging members 13 urge the planetary gear section 51 against the internal gear section 40 in the eccentric direction of the planetary rotor 50.

In the present embodiment, a line of a force F1, which is radially applied to the meshing part 41 between the internal gear section 40 and the planetary gear section 51, and a line of a force F2, which is radially applied to the planetary rotor 50, are spaced from each other in the axial direction of the rotation center axis Cr1.

Here, the force F1 is radially inwardly applied to the axial center of the meshing part 41, which is centered in the axial direction of the meshing part 41 (the axial direction of the rotation center axis Cr1). The force F2 is radially outwardly applied from the axial center of the urging members 13, which is centered in the axial direction of the urging members 13 (the axial direction of the rotation center axis Cr1), to the bearing 11 and the planetary rotor 50. Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy the relationship of $\theta2<\theta1$. Therefore, by actively tilting the planetary rotor 50 relative to the other members with the structure described above, the clearance between the Oldham coupling 60 and the other member(s) and the clearance in the Oldham coupling 60 can be actively reduced.

A flange 71 is formed at the end part of the eccentric shaft 70, which is opposite to the camshaft 3, such that the flange 71 is shaped in a plate form and radially outwardly extends from an outer peripheral wall of the end part of the eccentric shaft 70.

As described above, according to the present embodiment, the internal gear section 40 is formed at the drive-side rotor 20 (serving as one of the driven-side rotor 30 and the drive-side rotor 20). The planetary rotor 50 has the planetary gear section 51 which is eccentric to the rotation center axis Cr1 and is meshed with the internal gear section 40. The Oldham coupling 60 includes: a driven Oldham flange 61 that is formed at the driven-side rotor 30 (serving as another one of the driven-side rotor 30 and the drive-side rotor 20); a drive Oldham flange 62 that is formed at the planetary rotor 50; and an Oldham intermediate 63 that is configured to synchronize rotation of the driven Oldham flange 61 and rotation of the drive Oldham flange 62 while permitting eccentricity between the driven Oldham flange 61 and the drive Oldham flange 62.

The valve timing adjustment device is configured to satisfy the relationship of θ2<θ1 where: θ1 is the maximum tilt amount of the planetary rotor 50 relative to the driven Oldham flange 61; and θ2 is the maximum tilt amount of the planetary rotor 50 in the clearance formed at the Oldham coupling 60. Therefore, when the planetary rotor 50 is tilted close to θ1, which is the maximum tilt amount of the planetary rotor 50 relative to the driven Oldham flange 61, the clearance between the Oldham coupling 60 and the other member(s) and the clearance in the Oldham coupling 60 can be reduced. Therefore, it is possible to limit the generation of the noise from the Oldham coupling 60 at the time of operating the valve timing adjustment device 10.

Furthermore, in the present embodiment, the line of the force F1, which is radially applied to the meshing part 41 between the internal gear section 40 and the planetary gear section 51, and the line of the force F2, which is radially applied to the planetary rotor 50, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Seventh Embodiment

Figure 11:
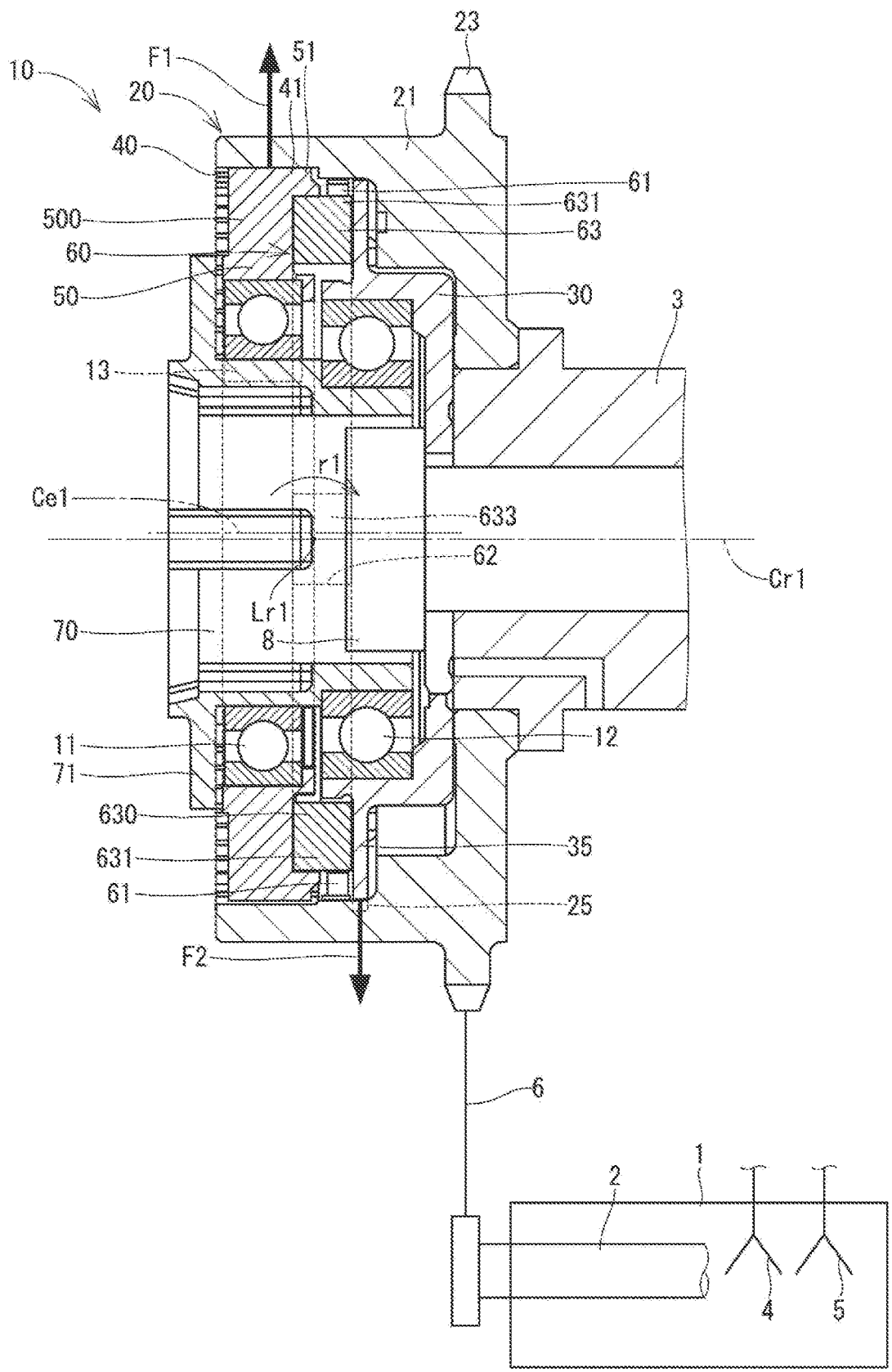
FIG. 11 is a cross-sectional view of a valve timing adjustment device of a seventh embodiment.

FIG. 11 shows a valve timing adjustment device of a seventh embodiment. The seventh embodiment differs from the sixth embodiment with respect to locations of lines of forces respectively applied to the corresponding members.

In the present embodiment, the drive-side rotor 20, at which the internal gear section 40 is formed, has a bearing portion 25 that rotatably and radially supports the driven-side rotor 30. The bearing portion 25 is formed at the inner peripheral wall of the rotor tubular portion 21 at a location where the bearing portion 25 is opposed to an outer periphery of the flange 35 of the driven-side rotor 30.

A line of a force F1, which is radially applied to the meshing part 41 between the internal gear section 40 and the planetary gear section 51, and a line of a force F2, which is radially applied to the bearing portion 25, are spaced from each other in the axial direction of the rotation center axis Cr1.

Here, the force F1 is radially outwardly applied to the axial center of the meshing part 41, which is centered in the axial direction of the meshing part 41 (the axial direction of the rotation center axis Cr1). The force F2 is radially outwardly applied from the outer periphery of the flange 35 of the driven-side rotor 30 to the axial center of the bearing portion 25 (the axial direction of the rotation center axis Cr1). Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy the relationship of θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the drive-side rotor 20 (serving as the one of the driven-side rotor 30 and the drive-side rotor 20, at which the internal gear section 40 is formed) has the bearing portion 25 that rotatably and radially supports the driven-side rotor 30 (serving as the another one of the driven-side rotor 30 and the drive-side rotor 20). The line of the force F1, which is radially applied to the meshing part 41 between the internal gear section 40 and the planetary gear section 51, and the line of the force F2, which is radially applied to the bearing portion 25, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Eighth Embodiment

Figure 12:
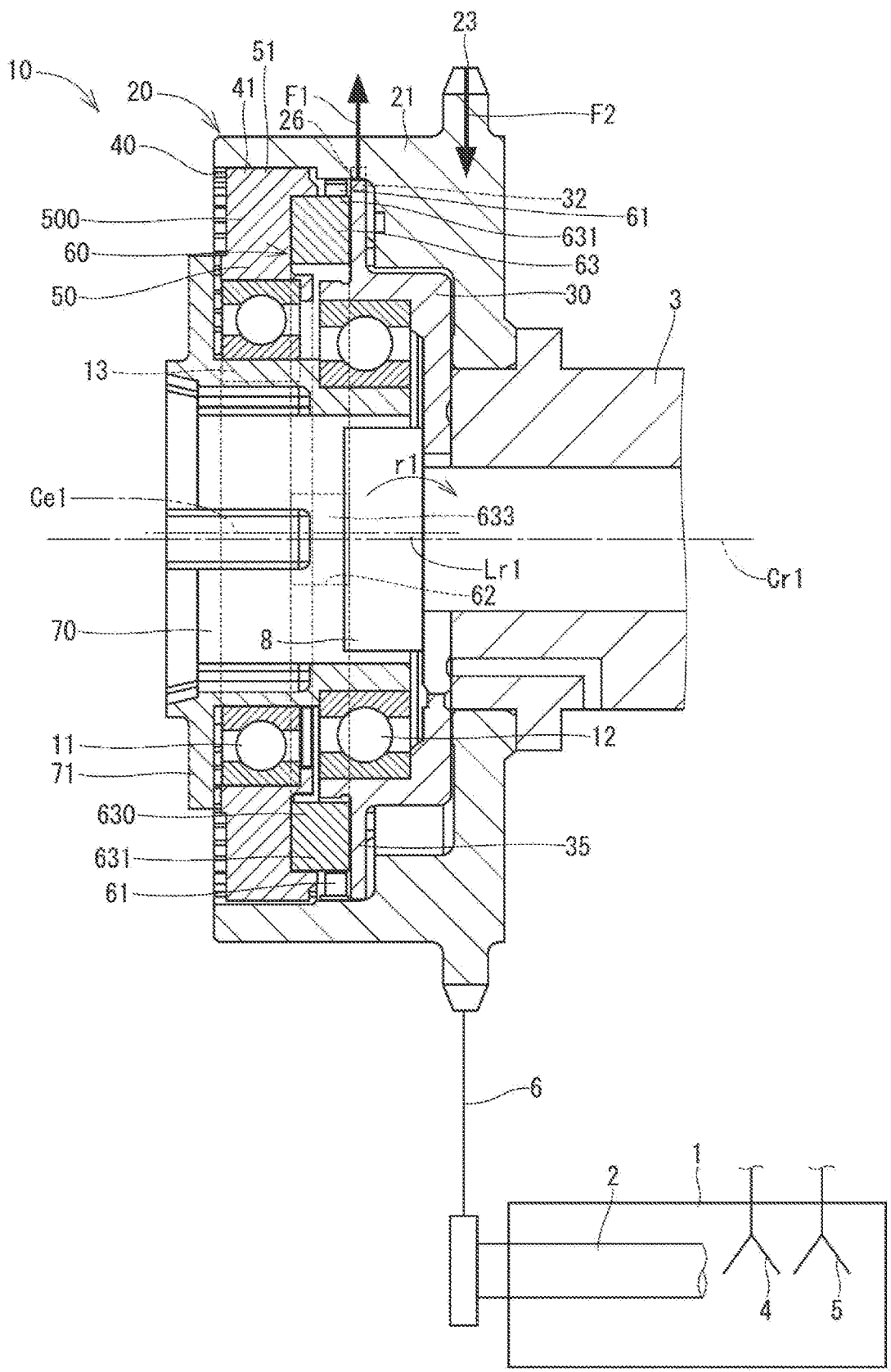
FIG. 12 is a cross-sectional view of a valve timing adjustment device of an eighth embodiment.

FIG. 12 shows a valve timing adjustment device of an eighth embodiment. The eighth embodiment differs from the sixth embodiment with respect to locations of lines of forces respectively applied to the corresponding members.

In the present embodiment, the drive-side rotor 20 has a bearing portion 26 that rotatably and radially supports the driven-side rotor 30. The bearing portion 26 is formed at the inner peripheral wall of the rotor tubular portion 21 such that the bearing portion 26 is opposed to the outer periphery of the flange 35 of the driven-side rotor 30. A bearing portion 32, which is opposed to the bearing portion 26, is formed at the outer periphery of the flange 35.

The drive-side rotor 20 includes the engaging portion 23, to which the looped transmission member 6 configured to transmit the torque from the crankshaft 2 is engaged. The engaging portion 23 is formed at an outer peripheral wall of a camshaft 3 side end part of the rotor tubular portion 21.

A line of a force F1, which is radially applied to the bearing portion 26, and a line of a force F2, which is radially applied from the looped transmission member 6 to the engaging portion 23, are spaced from each other in the axial direction of the rotation center axis Cr1.

Here, the force F1 is radially outwardly applied to an axial center of the bearing portion 26, which is centered in an axial direction of the bearing portion 26 (the axial direction of the rotation center axis Cr1). The force F2 is radially inwardly applied from the looped transmission member 6 to an axial center of the engaging portion 23, which is centered in the axial direction of the engaging portion 23 (the axial direction of the rotation center axis Cr1). Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy the relationship of θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the drive-side rotor 20 includes: the bearing portion 26 that rotatably and radially supports the driven-side rotor 30; and the engaging portion 23, to which the looped transmission member 6 configured to transmit the torque from the crankshaft 2 is engaged. The line of the force F1, which is radially applied to the bearing portion 26, and the line of the force F2, which is radially applied from the looped transmission member 6 to the engaging portion 23, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Ninth Embodiment

Figure 13:
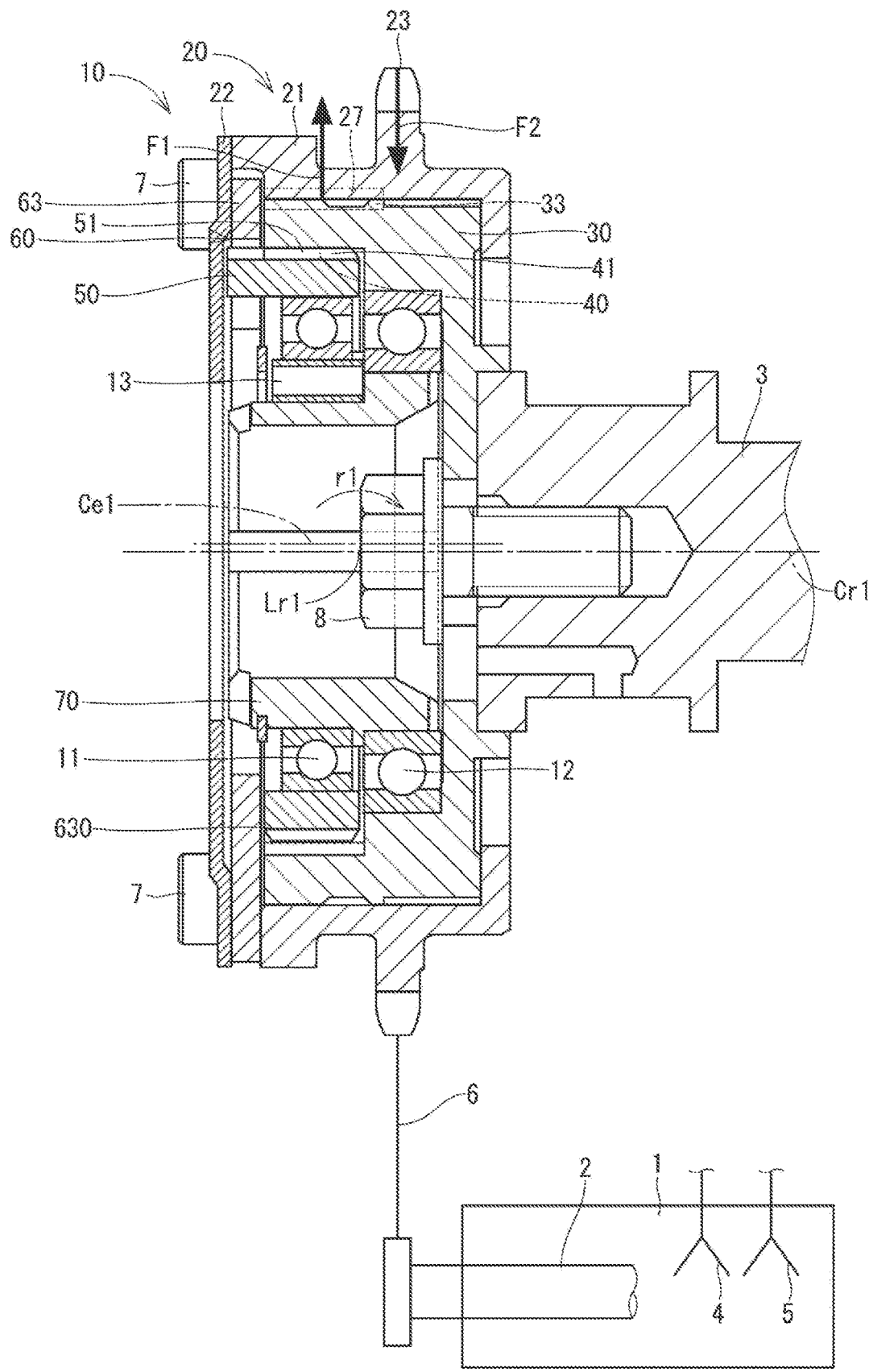
FIG. 13 is a cross-sectional view of a valve timing adjustment device of a ninth embodiment.

FIG. 13 shows a valve timing adjustment device of a ninth embodiment. The ninth embodiment is somewhat different from the fifth embodiment in the structure of each member, but is generally the same as the fifth embodiment in the arrangement of each member. The ninth embodiment differs from the fifth embodiment with respect to locations of lines of forces respectively applied to the corresponding members.

In the present embodiment, the urging members 13 are installed to the outer peripheral wall of the end part of the eccentric shaft 70, which is opposite to the camshaft 3, such that the urging members 13 are placed at the eccentric side of the outer peripheral wall of the end part of the eccentric shaft 70. The urging members 13 urge the planetary rotor 50 through the bearing 11 toward the radially outer side, i.e., in the eccentric direction of the planetary rotor 50. The urging members 13 urge the planetary gear section 51 against the internal gear section 40 in the eccentric direction of the planetary rotor 50.

In the present embodiment, the drive-side rotor 20 has a bearing portion 27 that rotatably and radially supports the driven-side rotor 30. The bearing portion 27 is formed at the inner peripheral wall of the rotor tubular portion 21 such that the bearing portion 27 is opposed to the outer peripheral wall of the end part of the driven-side rotor 30 which is opposite to the camshaft 3. A bearing portion 33, which is opposed to the bearing portion 27, is formed at the outer peripheral wall of the driven-side rotor 30.

The drive-side rotor 20 includes the engaging portion 23, to which the looped transmission member 6 configured to transmit the torque from the crankshaft 2 is engaged. The engaging portion 23 is formed at the outer peripheral wall of the rotor tubular portion 21 at the corresponding location that is on the outer side of the bearing 12 in the radial direction.

A line of a force F1, which is radially applied to the bearing portion 27, and a line of a force F2, which is radially applied from the looped transmission member 6 to the engaging portion 23, are spaced from each other in the axial direction of the rotation center axis Cr1.

Here, the force F1 is radially outwardly applied to an axial center of the bearing portion 27, which is centered in an axial direction of the bearing portion 27 (the axial direction of the rotation center axis Cr1). The force F2 is radially inwardly applied from the looped transmission member 6 to an axial center of the engaging portion 23, which is centered in the axial direction of the engaging portion 23 (the axial direction of the rotation center axis Cr1). Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

In the present embodiment, like in the first embodiment, the valve timing adjustment device 10 is configured to satisfy the relationship of θ2<θ1. Therefore, by actively tilting the planetary rotor 50 relative to the other members with the structure described above, the clearance between the Oldham coupling 60 and the other member(s) and the clearance in the Oldham coupling 60 can be actively reduced.

As described above, according to the present embodiment, the drive-side rotor 20 includes: the bearing portion 27 that rotatably and radially supports the driven-side rotor 30; and the engaging portion 23, to which the looped transmission member 6 configured to transmit the torque from the crankshaft 2 is engaged. The line of the force F1, which is radially applied to the bearing portion 27, and the line of the force F2, which is radially applied from the looped transmission member 6 to the engaging portion 23, are spaced from each other in the axial direction of the rotation center axis Cr1. Therefore, the planetary rotor 50 can be actively tilted relative to the other members, such as the drive-side rotor 20, the driven-side rotor 30 and the Oldham coupling 60. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Tenth Embodiment

Figure 14:
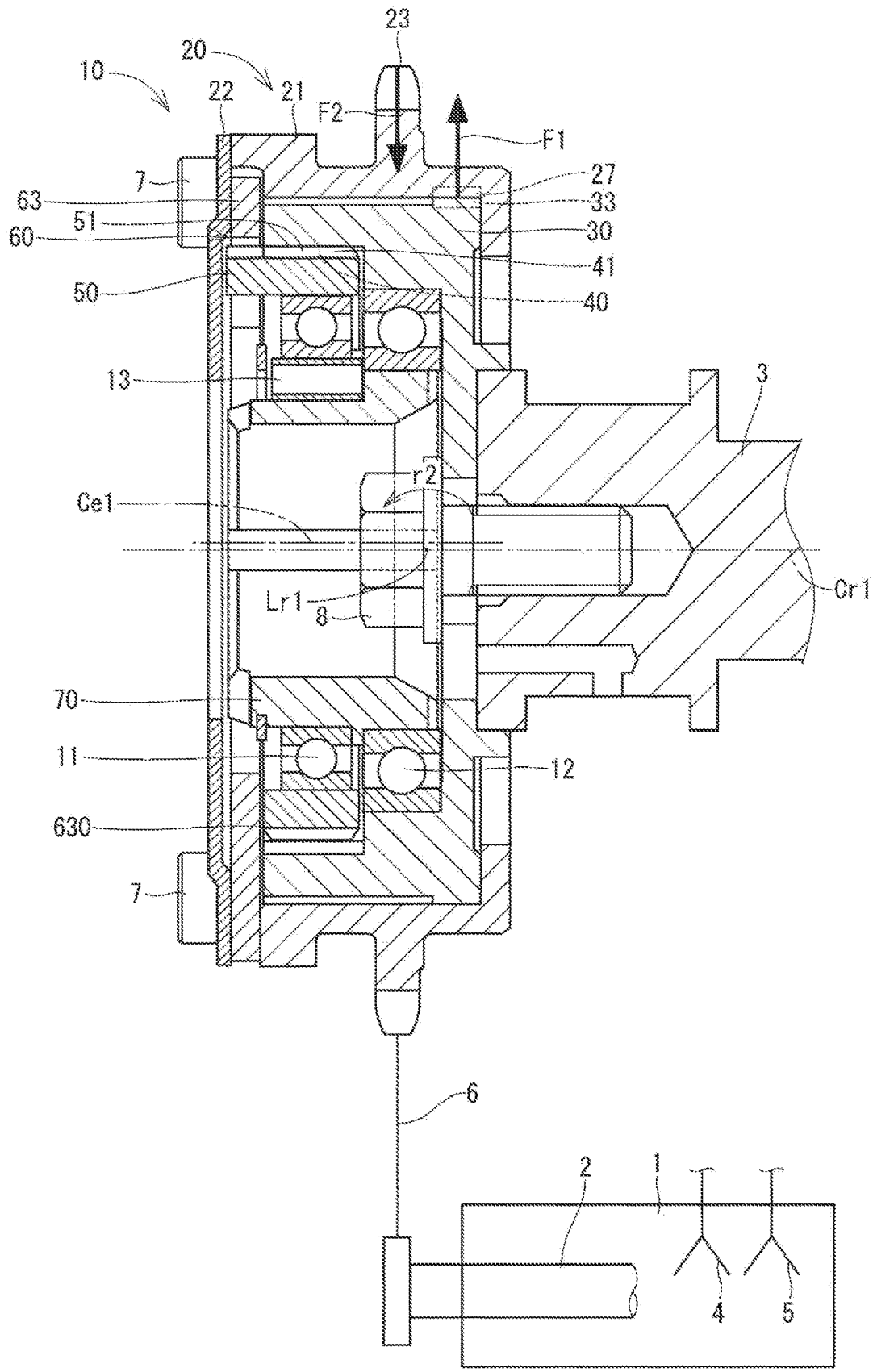
FIG. 14 is a cross-sectional view of a valve timing adjustment device of a tenth embodiment.

FIG. 14 shows a valve timing adjustment device of a tenth embodiment. The tenth embodiment differs from the ninth embodiment with respect to locations of lines of forces respectively applied to the corresponding members.

In the present embodiment, the bearing portion 27 is formed at the inner peripheral wall of the rotor tubular portion 21 such that the bearing portion 27 is opposed to the outer peripheral wall of the camshaft 3 side end part of the driven-side rotor 30. The bearing portion 33, which is opposed to the bearing portion 27, is formed at the outer peripheral wall of the driven-side rotor 30.

A line of a force F1, which is radially applied to the bearing portion 27, and a line of the force F2, which is radially applied from the looped transmission member 6 to the engaging portion 23, are spaced from each other in the axial direction of the rotation center axis Cr1.

Here, the force F1 is radially outwardly applied to the axial center of the bearing portion 27, which is centered in the axial direction of the bearing portion 27 (the axial direction of the rotation center axis Cr1). The force F2 is radially inwardly applied from the looped transmission member 6 to the axial center of the engaging portion 23, which is centered in the axial direction of the engaging portion 23 (the axial direction of the rotation center axis Cr1). Therefore, the planetary rotor 50 is tilted relative to the other members, such as the drive-side rotor 20, the driven-side rotor 30 and the Oldham coupling 60 so that the planetary rotor 50 is rotated in the rotation direction r1 about the straight line Lr1 (serving as the rotation axis) that is perpendicular to the rotation center axis Cr1.

Figure 15:
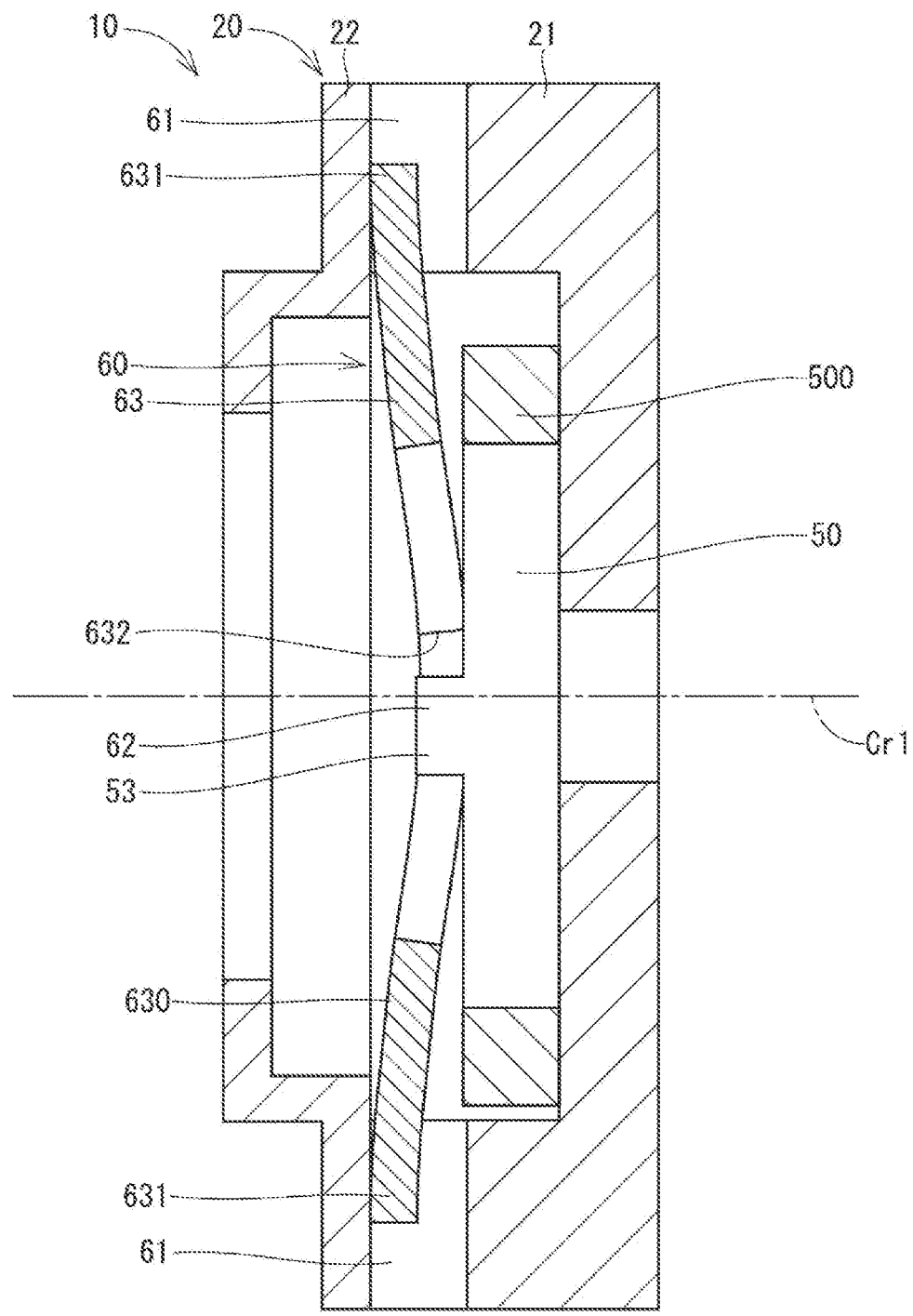
FIG. 15 is a schematic cross-sectional view showing a portion of a valve timing adjustment device of an eleventh embodiment.

As described above, according to the present embodiment, the drive-side rotor 20 includes: the bearing portion 27 that rotatably and radially supports the driven-side rotor 30; and the engaging portion 23, to which the looped transmission member 6 configured to transmit the torque from the crankshaft 2 is engaged. The line of the force F1, which is radially applied to the bearing portion 27, and the line of the force F2, which is radially applied from the looped transmission member 6 to the engaging portion 23, are spaced from each other in the axial direction of the rotation center axis Cr1. Therefore, like in the ninth embodiment, it is possible to more effectively limit the generation of the noise from the Oldham coupling 60 at the time of operating the valve timing adjustment device 10. cl Eleventh Embodiment FIG. 15 shows a valve timing adjustment device of an eleventh embodiment. The eleventh embodiment differs from the first embodiment with respect to the structure of the Oldham intermediate 63.

Figure 16:
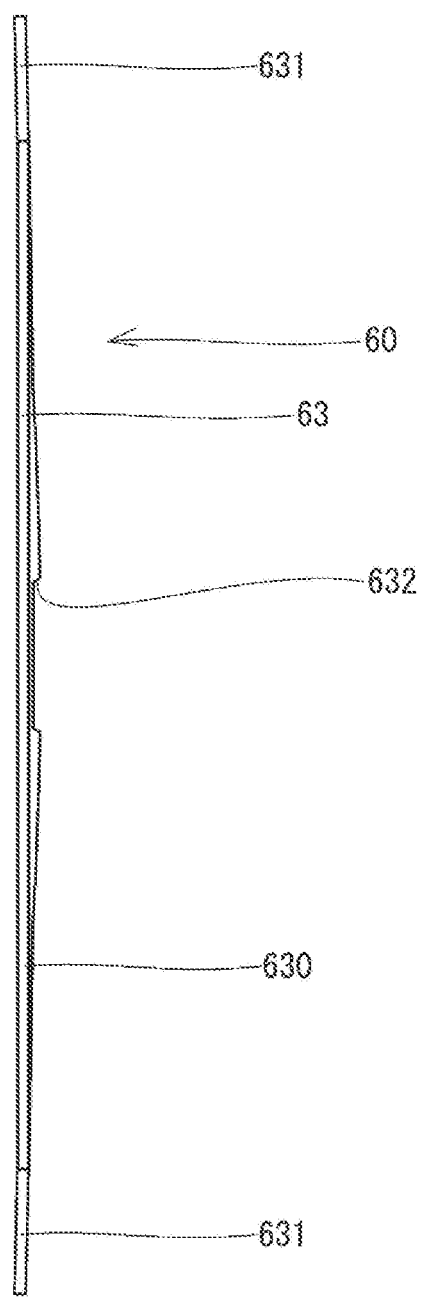
FIG. 16 is a diagram showing an Oldham intermediate of the valve timing adjustment device of the eleventh embodiment.
Figure 17:
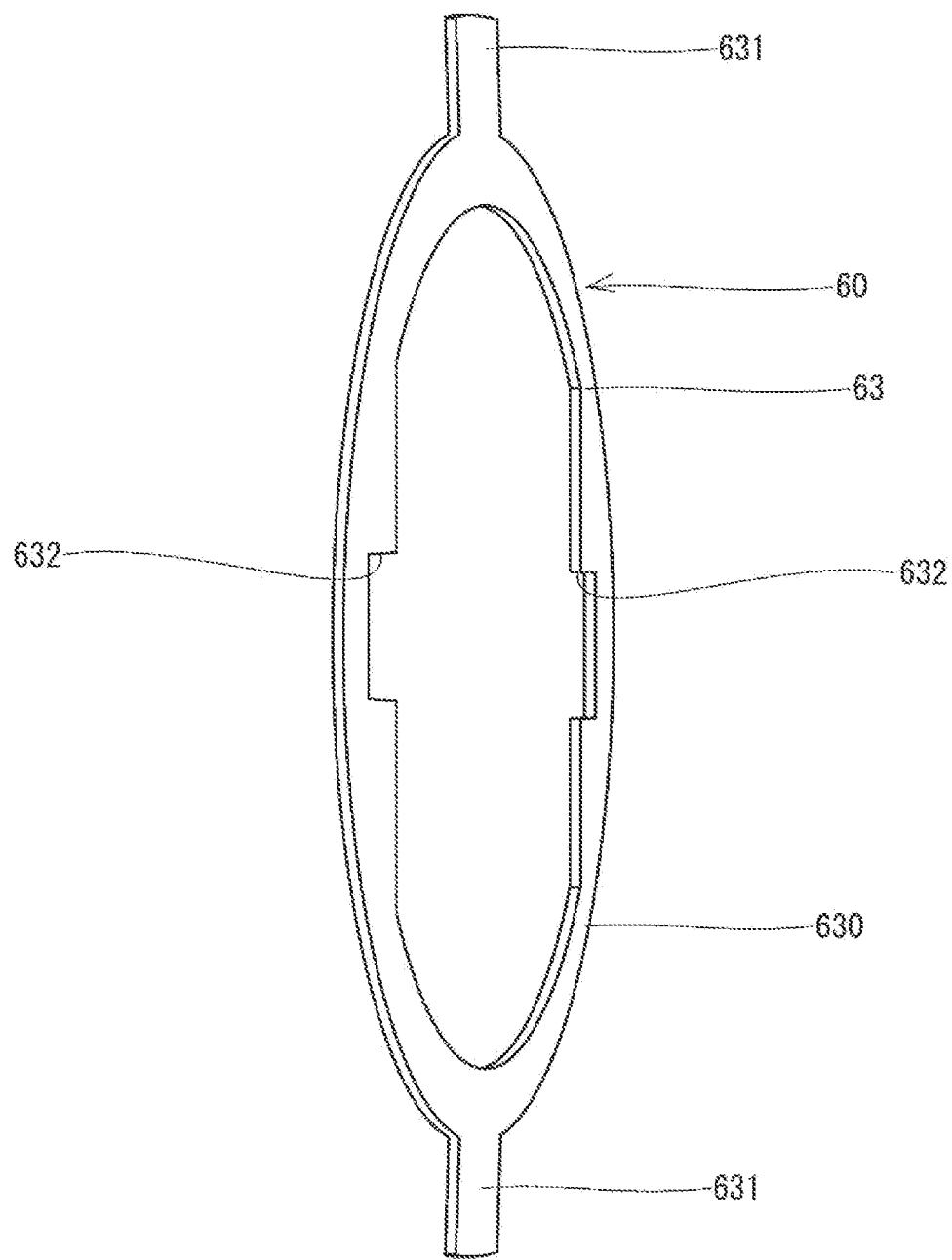
FIG. 17 is a perspective view showing the Oldham intermediate of the valve timing adjustment device of the eleventh embodiment.

In the present embodiment, the Oldham intermediate 63 is made of, for example, a resilient material, such as metal. The Oldham intermediate 63 is formed such that the center of the Oldham intermediate 63 projects toward the planetary rotor 50 (see FIGS. 15 to 17).

The Oldham intermediate 63 is installed between the planetary rotor 50 and the rotor plate portion 22. Therefore, the Oldham intermediate 63 urges the planetary rotor 50 toward the bottom part of the rotor tubular portion 21. Thus, the drive Oldham flanges 62 are spaced away from the driven Oldham flanges 61 in the axial direction of the rotation center axis Cr1. The depiction of the driven-side rotor 30 and the like is omitted in FIG. 15 for the sake of simplicity.

Figure 18:
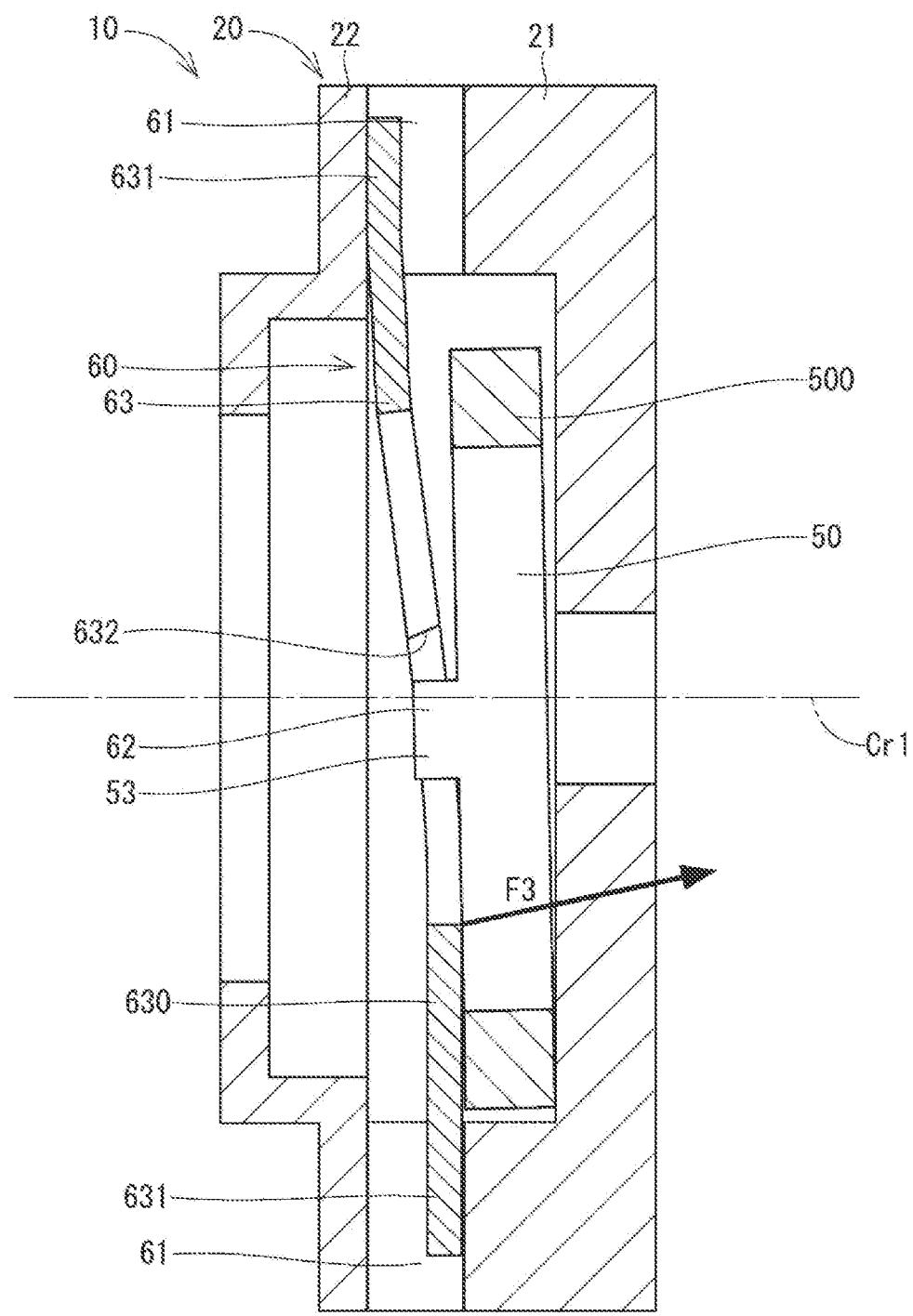
FIG. 18 is a schematic cross-sectional view showing a portion of a valve timing adjustment device of a twelfth embodiment.

As described above, according to the present embodiment, the Oldham intermediate 63 is configured to generate an urging force for urging the driven Oldham flange 61 and the drive Oldham flange 62 away from each other. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10. cl Twelfth Embodiment FIG. 18 shows a valve timing adjustment device of a twelfth embodiment. The twelfth embodiment differs from the eleventh embodiment with respect to the structure of the Oldham intermediate 63.

Figure 19:
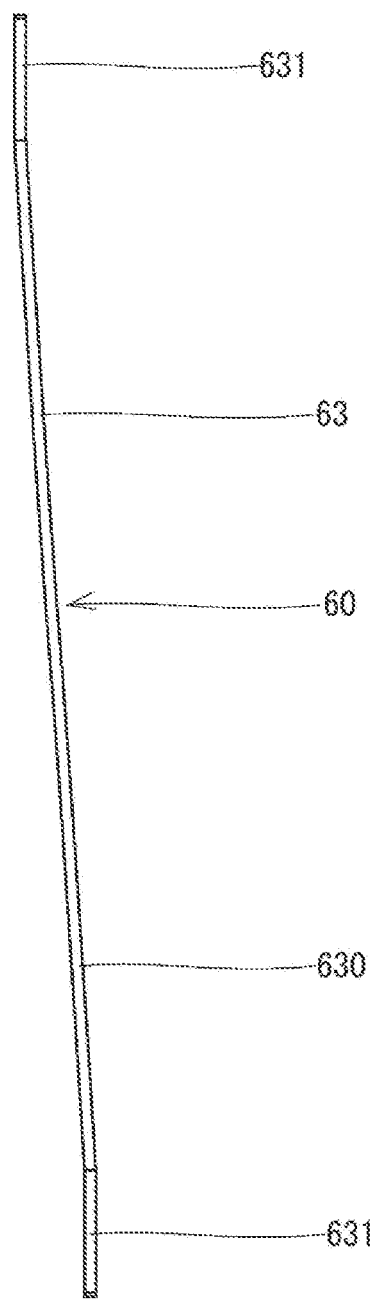
FIG. 19 is a diagram showing an Oldham intermediate of the valve timing adjustment device of the twelfth embodiment.
Figure 20:
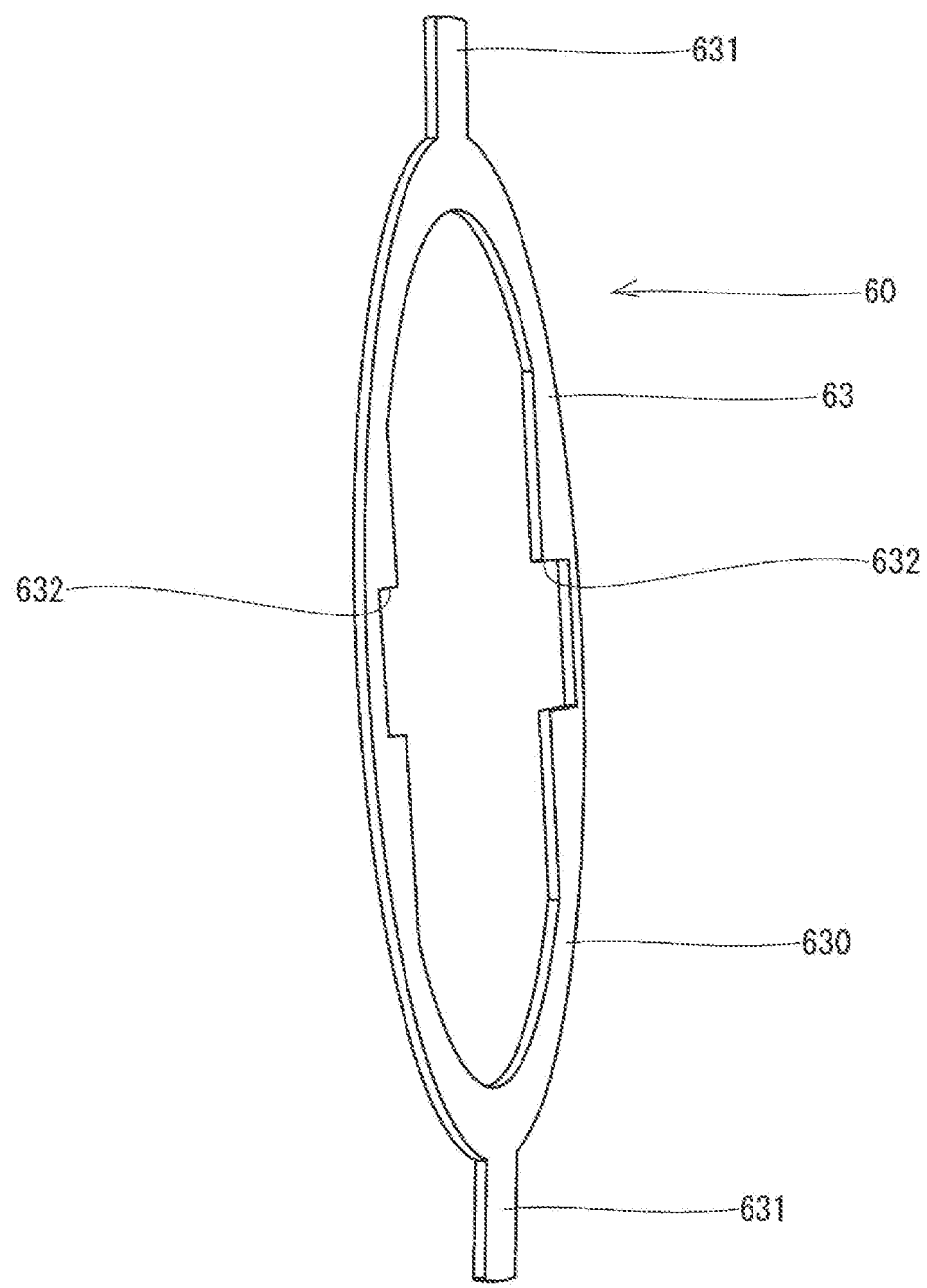
FIG. 20 is a perspective view showing the Oldham intermediate of the valve timing adjustment device of the twelfth embodiment.

In the present embodiment, a portion of the Oldham intermediate 63, which is adjacent to one of the two Oldham projections 631, is placed closer to the planetary rotor 50 in comparison to another portion of the Oldham intermediate 63, which is adjacent to another one of the two Oldham projections 631. Specifically, one end part and the other end part of the Oldham intermediate 63, which are opposite to each other in the direction perpendicular to the axis, are arranged such that the one end part of the Oldham intermediate 63 is closer to the planetary rotor 50 in comparison to the other end part of the Oldham intermediate 63 (see FIGS. 18 to 20).

Like in the eleventh embodiment, the Oldham intermediate 63 is installed between the planetary rotor 50 and the rotor plate portion 22. Therefore, the Oldham intermediate 63 urges the planetary rotor 50 toward the bottom part of the rotor tubular portion 21. Thus, the drive Oldham flanges 62 are spaced away from the driven Oldham flanges 61 in the axial direction of the rotation center axis Cr1.

Here, a direction of an urging force F3 generated by the Oldham intermediate 63 is tilted relative to the rotation center axis Cr1. Therefore, the planetary rotor 50 can be actively tilted relative to the other member, such as the drive-side rotor 20.

As described above, in the present embodiment, the Oldham intermediate 63 is made of, for example, the resilient material, such as metal. Here, the direction of the urging force F3 generated by the Oldham intermediate 63 is tilted relative to the rotation center axis Cr1. Therefore, the planetary rotor 50 can be actively tilted by the Oldham intermediate 63 relative to the other member, such as the drive-side rotor 20. Thus, it is possible to further actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Thirteenth Embodiment

Figure 21:
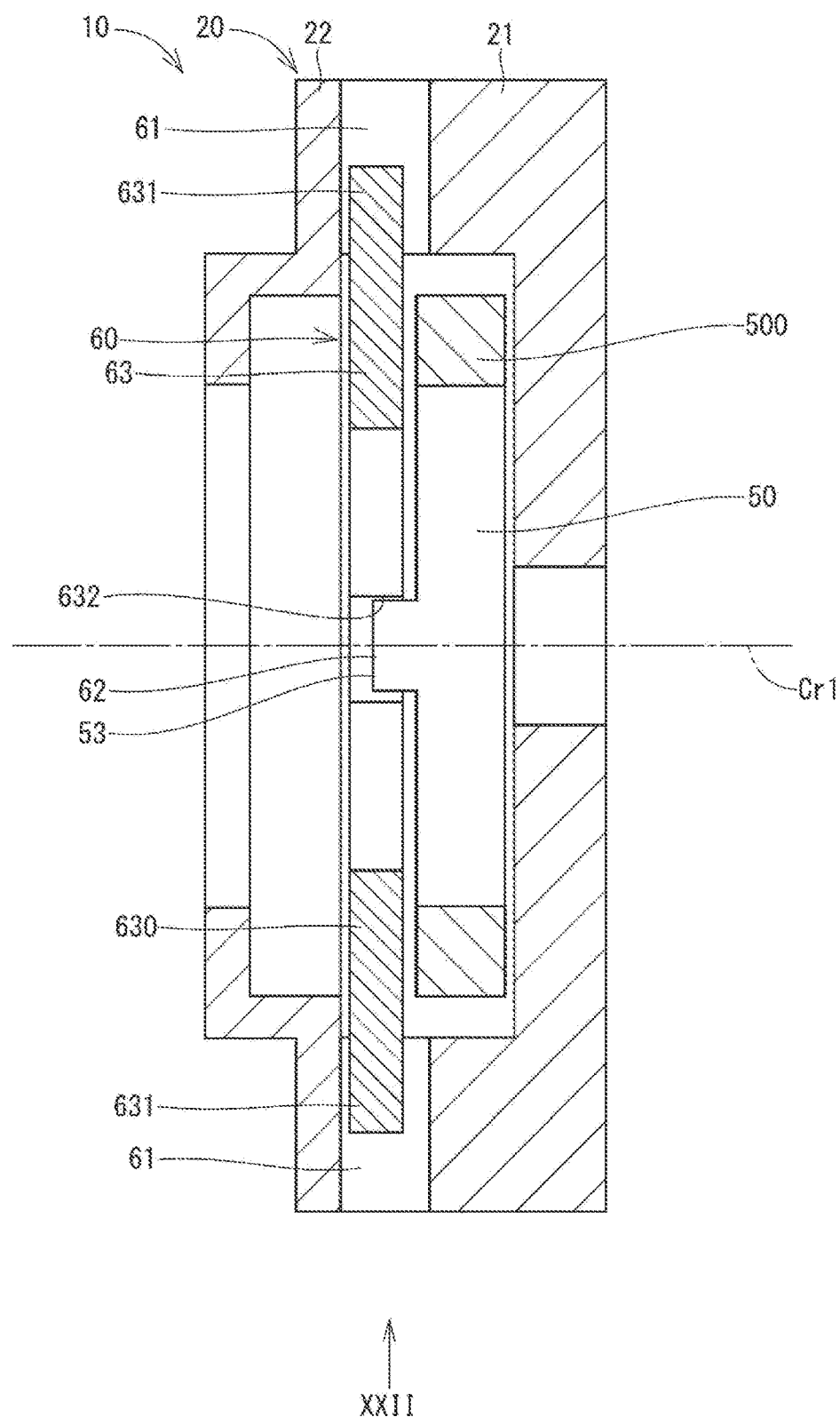
FIG. 21 is a schematic cross-sectional view showing a portion of a valve timing adjustment device of a thirteenth embodiment.

FIG. 21 shows a valve timing adjustment device of a thirteenth embodiment. The thirteenth embodiment differs from the eleventh embodiment with respect to the structure of the Oldham intermediate 63.

In the present embodiment, the Oldham intermediate 63 is shaped in a planar form (see FIG. 21).

Figure 22:
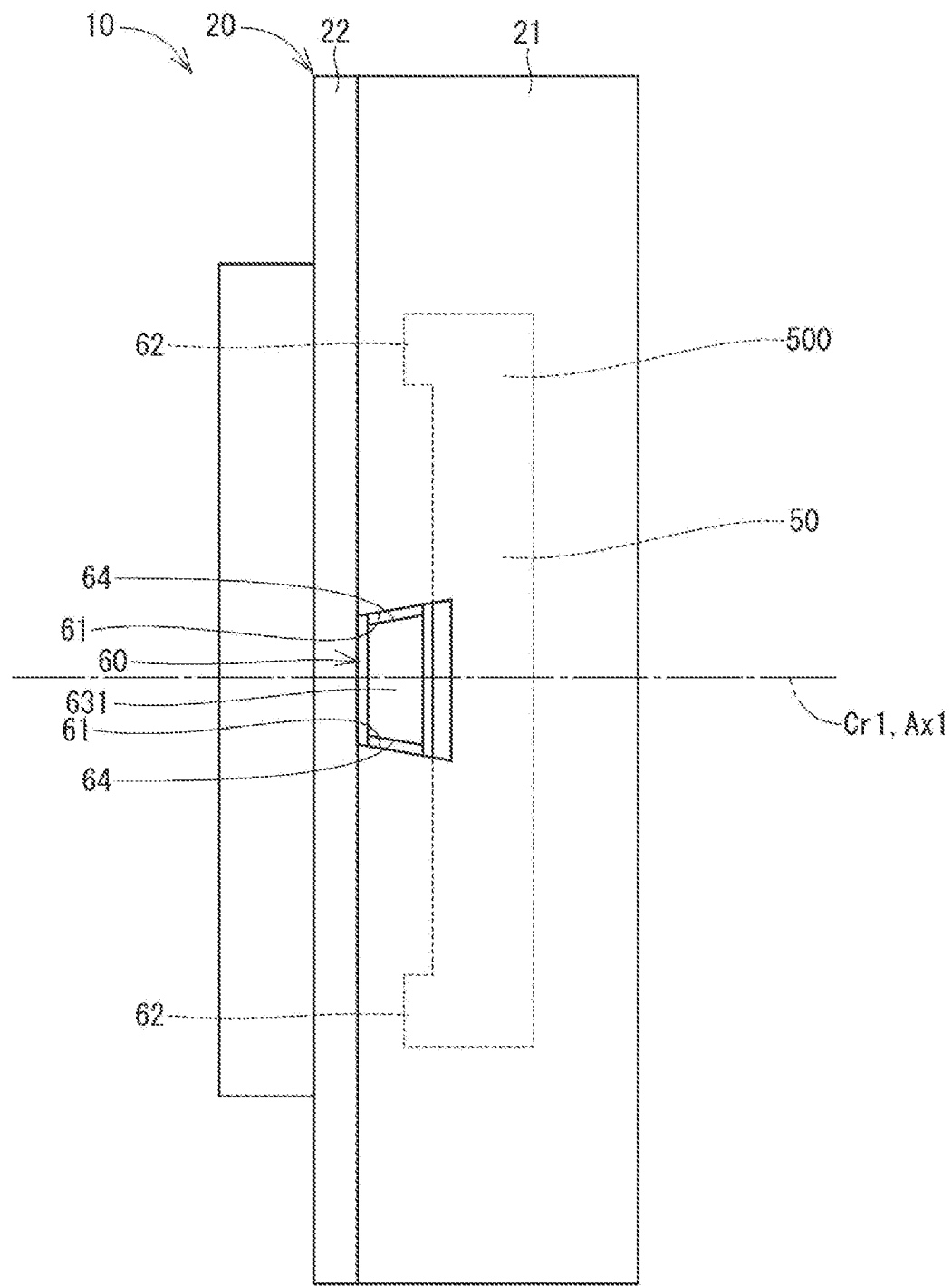
FIG. 22 is a view seen in a direction of an arrow XXII in FIG. 21.
Figure 23:
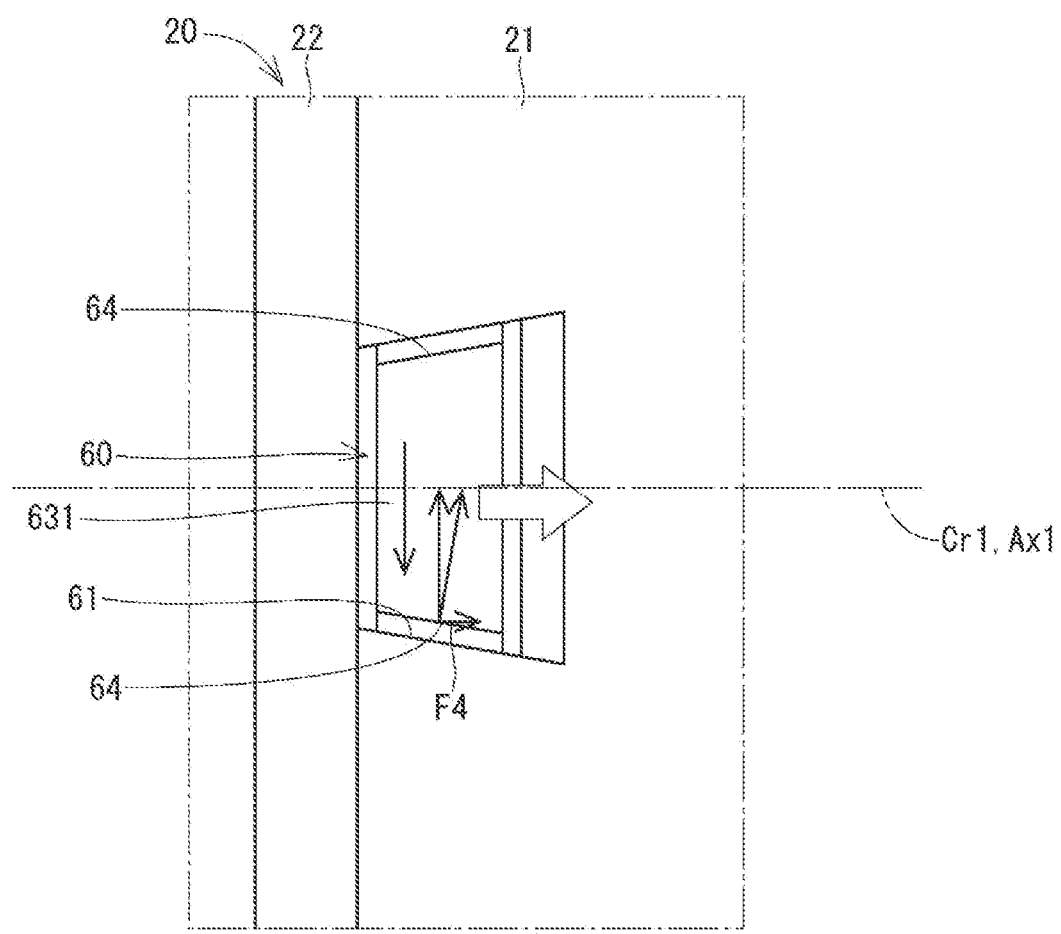
FIG. 23 is a diagram showing a driven Oldham flange of the valve timing adjustment device of the thirteenth embodiment.

In the Oldham intermediate 63, circumferentially contacting parts 64 of each of the Oldham projections 631, which are respectively formed as a contact surface that is configured to contact a corresponding one of the driven Oldham flanges 61, are respectively tilted relative to an axis Ax1 of the Oldham intermediate 63 (see FIGS. 22 and 23). Specifically, each of the circumferentially contacting parts 64, which are respectively configured to circumferentially contact the drive-side rotor 20, is tilted relative to the axis Ax1 of the Oldham intermediate 63.

Therefore, when the relative rotation is generated between the drive-side rotor 20 and the Oldham intermediate 63 by the torque transmitted from the crankshaft 2 to the drive-side rotor 20, a corresponding one of the circumferentially contacting parts 64 of each of the Oldham projections 631 generates a force component F4 in the axial direction of the axis Ax1 upon application of a circumferential load applied from the driven Oldham flange 61 to the circumferentially contacting part 64 in response to the transmission of the torque to urge the driven Oldham flanges 61 and the drive Oldham flanges 62 away from each other with the force component F4 (see FIG. 23).

As described above, according to the present embodiment, the circumferentially contacting part 64 of the Oldham intermediate 63, which is configured to circumferentially contact the drive-side rotor 20, is tilted relative to the axis Ax1 of the Oldham intermediate 63 and is configured to generate the axial force component F4 upon application of the circumferential load to the circumferentially contacting part 64 in response to the transmission of the torque to urge the driven Oldham flange 61 and the drive Oldham flange 62 away from each other with the axial force component F4. Thus, it is possible to actively reduce the clearance between the Oldham coupling 60 and the other member(s) and the clearance in the Oldham coupling 60. Therefore, it is possible to more effectively limit the generation of the noise from the Oldham coupling 60 at the time of operating the valve timing adjustment device 10.

Other Embodiments

In another embodiment, as long as the relationship of $\theta 2 < \theta 1$ is satisfied, the valve timing adjustment device 10 may not satisfy the relationships of: $\theta 1 = \arctan (CL5/L3)$; and $\theta 2 = \arctan ((CL1+CL2)/L1) + \arctan ((CL3+CL4)/L2)$.

Furthermore, in another embodiment, for example, a belt may be used as the looped transmission member 6 in place of the chain.

In another embodiment, the valve timing adjustment device 10 may adjust a valve timing of the exhaust valves 5 of the engine 1.

As described above, the present disclosure should not be limited to the above embodiments and may be implemented in various forms without departing from the scope of the present disclosure.

The present disclosure has been described with reference to the embodiments. However, the present disclosure should not be limited to the embodiments and the structures described therein. The present disclosure also includes various variations and variations within an equivalent range. Furthermore, other combinations and other forms including various combinations and various forms of only one element, or more, or less, are also within the scope and spirit of the present disclosure.

What is claimed is:

1. A valve timing adjustment device for adjusting a valve timing of a valve that is opened and closed by a camshaft with a torque transmitted from a crankshaft at an internal combustion engine, the valve timing adjustment device comprising:
    a drive-side rotor that is configured to be rotated synchronously with the crankshaft about a rotation center axis that is coaxial with the camshaft;
    a driven-side rotor that is configured to be rotated integrally with the camshaft about the rotation center axis;
    an internal gear section that is formed at one of the driven-side rotor and the drive-side rotor;
    a planetary rotor that has a planetary gear section which is eccentric to the rotation center axis and is meshed with the internal gear section; and
    an Oldham coupling that includes:
        a driven Oldham flange that is formed at another one of the driven-side rotor and the drive-side rotor;
        a drive Oldham flange that is formed at the planetary rotor; and
        an Oldham intermediate that is configured to synchronize rotation of the driven Oldham flange and rotation of the drive Oldham flange while permitting eccentricity between the driven Oldham flange and the drive Oldham flange, wherein:
    the valve timing adjustment device is configured to satisfy a relationship of $\theta 2 < \theta 1$ where: $\theta 1$ is a maximum tilt amount of the planetary rotor relative to the driven Oldham flange; and $\theta 2$ is a maximum tilt amount of the planetary rotor in a clearance formed at the Oldham coupling.

2. The valve timing adjustment device according to claim 1, wherein:
    the valve timing adjustment device is further configured to satisfy all of relationships of:
    $\theta 1 = \arctan (CL5/L3)$; and
    $\theta 2 = \arctan ((CL1+CL2)/L1) + \arctan ((CL3+CL4)/L2)$, where:
    CL1 is one of two opposite axial clearances respectively formed between the Oldham intermediate and the drive-side rotor in an axial direction of the rotation center axis, and CL2 is another one of the two opposite axial clearances respectively formed between the Oldham intermediate and the drive-side rotor in the axial direction;
    L1 is a diameter of an axially contacting part of the Oldham intermediate that is configured to axially contact the drive-side rotor;
    CL3 is one of two opposite circumferential clearances respectively formed between the planetary rotor and the Oldham intermediate in a circumferential direction, and CL4 is another one of the two opposite circumferential clearances respectively formed between the planetary rotor and the Oldham intermediate in the circumferential direction;
    L2 is an axial length of a circumferentially contacting part of the Oldham intermediate that is configured to circumferentially contact the planetary rotor;
    CL5 is an axial clearance between the planetary rotor and the drive-side rotor; and
    L3 is a diameter of an axially contacting part of the planetary rotor that is configured to axially contact the drive-side rotor.

3. The valve timing adjustment device according to claim 1, wherein a line of a force, which is radially applied to a meshing part between the internal gear section and the planetary gear section, and a line of a force, which is radially applied to the planetary rotor, are spaced from each other in the axial direction of the rotation center axis.

4. The valve timing adjustment device according to claim 1, wherein:
    the one of the driven-side rotor and the drive-side rotor, at which the internal gear section is formed, has a bearing portion that rotatably and radially supports the another one of the driven-side rotor and the drive-side rotor; and
    a line of a force, which is radially applied to a meshing part between the internal gear section and the planetary gear section, and a line of a force, which is radially applied to the bearing portion, are spaced from each other in the axial direction of the rotation center axis.

5. The valve timing adjustment device according to claim 1, wherein:

the drive-side rotor includes:
- a bearing portion that rotatably and radially supports the driven-side rotor; and
- an engaging portion, to which a looped transmission member configured to transmit the torque from the crankshaft is engaged; and a line of a force, which is radially applied to the bearing portion, and a line of a force, which is radially applied from the looped transmission member to the engaging portion, are spaced from each other in the axial direction of the rotation center axis.

6. The valve timing adjustment device according to claim 1, wherein the Oldham intermediate is configured to generate an urging force for urging the driven Oldham flange and the drive Oldham flange away from each other.

7. The valve timing adjustment device according to claim 6, wherein:
- at least a portion of the Oldham intermediate is made of a resilient material; and
- a direction of an urging force generated by the Oldham intermediate is tilted relative to the rotation center axis.

8. The valve timing adjustment device according to claim 6, wherein at least a portion of a circumferentially contacting part of the Oldham intermediate, which is configured to circumferentially contact the drive-side rotor, is tilted relative to an axis of the Oldham intermediate and is configured to generate an axial force component upon application of a circumferential load to the circumferentially contacting part of the Oldham intermediate in response to transmission of the torque to urge the driven Oldham flange and the drive Oldham flange away from each other with the axial force component.

* * * * *